(12) United States Patent
Satou et al.

(10) Patent No.: US 7,915,560 B2
(45) Date of Patent: Mar. 29, 2011

(54) TIG WELDING EQUIPMENT AND TIG WELDING METHODS

(75) Inventors: Toyoyuki Satou, Shinagawa-ku (JP); Koji Nakamura, Shinagawa-ku (JP); Yutaka Kimura, Shinagawa-ku (JP); Hidetoshi Fujii, Ibaraki (JP); Shanping Lu, Shenyang (CN); Kiyoshi Nogi, Ibaraki (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 458 days.

(21) Appl. No.: 11/673,983

(22) Filed: Feb. 12, 2007

(65) Prior Publication Data

US 2008/0296269 A1 Dec. 4, 2008

Related U.S. Application Data

(63) Continuation-in-part of application No. 10/804,823, filed on Mar. 19, 2004, now abandoned.

(30) Foreign Application Priority Data

Mar. 19, 2003 (JP) ................................. 2003-076318

(51) Int. Cl.
*B23K 37/00* (2006.01)
(52) U.S. Cl. ..................................... 219/74; 219/121.46
(58) Field of Classification Search ............. 219/121.46, 219/137 R, 74, 75, 76.15
See application file for complete search history.

(56) References Cited

U.S. PATENT DOCUMENTS

| | | | |
|---|---|---|---|
| 4,161,645 A | 7/1979 | Shimada et al. | |
| 4,527,038 A | 7/1985 | Cuny et al. | |
| 4,680,440 A | 7/1987 | Barlet | |
| 5,597,109 A | 1/1997 | Ohmi et al. | |
| 6,371,359 B1 * | 4/2002 | Kimura et al. | 228/175 |

FOREIGN PATENT DOCUMENTS

| | | |
|---|---|---|
| DE | 2608115 | 9/1976 |
| EP | 0799666 A1 | 10/1997 |
| EP | 1459830 A1 | 9/2004 |
| JP | 50-92844 | 7/1975 |
| JP | 55-122684 | 9/1980 |
| JP | 60-170580 | 9/1985 |
| JP | 61-017371 | 1/1986 |
| JP | 06-277847 | 10/1994 |
| JP | 6-297149 | 10/1994 |
| JP | 9-10943 | 1/1997 |
| JP | 09-070667 | 3/1997 |
| JP | 10-249529 | 9/1998 |
| JP | 11-138264 | 5/1999 |
| JP | 2003-019561 | 1/2003 |

* cited by examiner

*Primary Examiner* — Mark H Paschall
*Assistant Examiner* — Brian Jennison
(74) *Attorney, Agent, or Firm* — Kilpatrick Townsend & Stockton LLP

(57) ABSTRACT

The TIG welding methods of the present invention include generating an electric arc between an electrode and an object to weld the object, wherein a first shielding gas including an inert gas flows toward the welded object surrounding the electrode, a second shielding gas containing an oxidative gas flows toward the welded object along a periphery of the first shielding gas, and the concentration of the oxidative gas in the second shielding gas is set such that the oxygen concentration in the welded metal portion of the welded object is within a range of 70 to 220 wt. ppm.

4 Claims, 18 Drawing Sheets

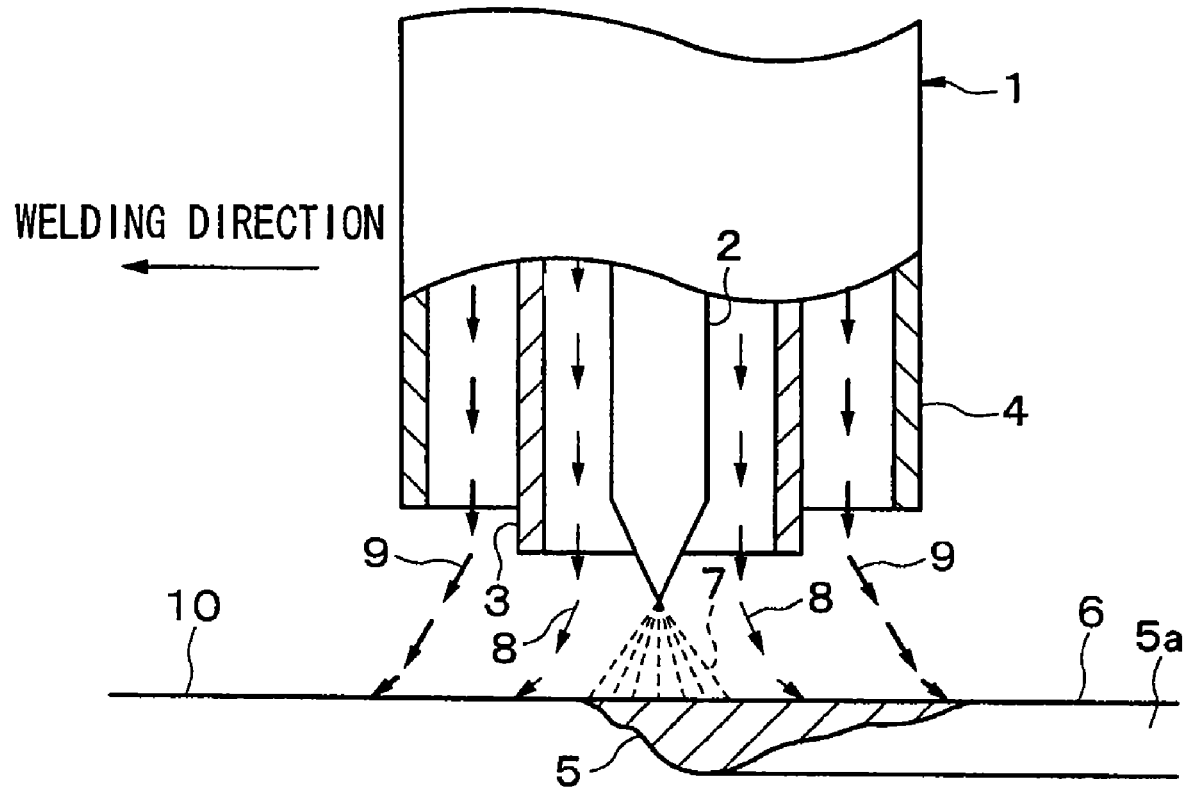

WELDING DIRECTION

WELDING DIRECTION

WELDING DIRECTION

WELDING DIRECTION

WELDING DIRECTION

FIG. 9
| OXYGEN CONCENTRATION IN SECOND SHIELDING GAS (vol. ppm) | FLOW RATE OF SECOND SHIELDIHG GAS | |
| --- | --- | --- |
| | 10 L/min | 20 L/min |
| 0 (PURE ARGON) |  |  |
| 1000 |  | 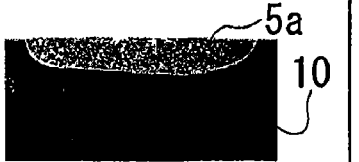 |
| 3000 |  | 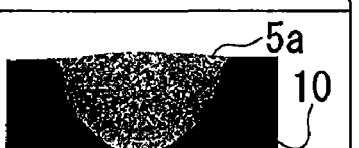 |
| 4000 |  |  |
| 5000 |  |  |
| 7000 |  | 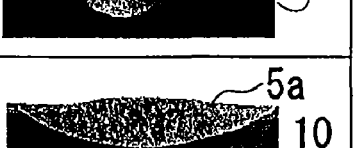 |
| 9000 |  |  |

FLOW RATE OF SECOND SHIELDING GAS 10L/min

FLOW RATE OF SECOND SHIELDING GAS 20L/min

TIG WELDING EQUIPMENT AND TIG WELDING METHODS

CROSS-REFERENCES TO RELATED APPLICATIONS

This application is a continuation-in-part (CIP) application of U.S. patent application Ser. No. 10/804,823, filed on Mar. 19, 2004, which claims the priority benefit of Japanese patent application serial no. 2003-076318, filed on Mar. 19, 2003.

BACKGROUND OF THE INVENTION

1. Field of the Invention

The present invention relates to welding methods used in tungsten-inert-gas (TIG) welding of steel-based materials.

2. Description of Related Art

Conventionally, structures made of steel-based materials, such as carbon steel or stainless steel as the base material, are welded using TIG welding processes. TIG welding is widely used as a method of welding structures requiring high reliability since the welding operation can be easily performed and the welded metal portion can be formed with high-quality (See Japanese Patent Application Laid Open No. 2003-019561). However, since steel-based materials, including stainless steel based materials used in recent years usually contain less sulfur as an impurity, the welded metal portion formed during TIG welding processes have a wide and shallow weld-penetration shape such that the welding effect is insufficient. To form a deeply welded metal portion, increasing the number of passes is required. When the number of passes is increased however, the welding efficiency can be adversely lowered.

Other welding methods include MAG (metal-active-gas) weld, MIG (metal-inert-gas) weld, plasma weld, and so on, which are used when deeply welded metal portions and highly efficient welding operations are required. MAG and MIG welds have problems however, including deterioration of welding quality and occurrence of welding defects. Moreover, plasma welds have narrow tolerance ranges for groove accuracy, making the method difficult to use in a construction site or the like.

Methods for improving the problems of shallow welded metal portions that are significant in TIG welding processes have been proposed. These methods utilize a shielding gas, including a mixed gas obtained by mixing an inert gas like argon with hydrogen or helium. Other recently proposed TIG welding methods use active flux (the A-TIG welding method). However, these welding methods which use a shielding gas containing hydrogen are difficult to apply to a material other than austenitic stainless steel because of problems including generation of blowholes and embrittlement of the welded metal portion. In addition, using helium is not preferable in consideration of the cost. Moreover, the workability of the method using active flux is poor, since a coating operation is required before the welding process. Also, since considerable slag is generated on the weld bead, the appearance of the bead is poor, and slag removal is required in multi-layer welds to prevent the degradation of the bead appearance. Furthermore, a lot of fume is generated in the above welding methods which adversely affects the work environment.

In anode-type (DC electrode positive type) arc welding methods including MAG welding, a shielding gas including argon gas mixed with an oxidative component, such as carbon dioxide in a concentration of 20%, is used for improving the stability of the electric arc. However, when an oxidative gas is used as a shielding gas in TIG welding processes, the electrode is easily deteriorated and cannot be used in long-time welds or used repeatedly. If a deteriorated electrode is used, the welding quality is not stable, and weld defects may possibly occur.

BRIEF SUMMARY OF THE INVENTION

In view of the foregoing, the invention provides TIG welding methods, which form deep welded metal portions with high quality welds, making the welding operation easier and more efficient.

After studying the issue with effort, the inventors found that the shape of the welded metal portion, and therefore the strength and quality of the resulting weld, is largely affected by convection in the molten pool. The main factor affecting this convection is the surface tension distribution in the pool caused by the differences in temperature and oxygen concentrations in the molten metal.

In the TIG welding methods described herein, the surface tension in the peripheral region of the molten pool is smaller than the tension in the central region. The difference in surface tensions in these regions is due to the lower temperature and higher oxygen concentration found in the peripheral region of the molten pool as compared to the central region. As a result of the difference in surface tensions in these regions, there is an inward and downward convection in the molten pool providing a deeply welded metal portion in the base material.

For deep, high quality welds, i.e., welds having high aspect ratios, it was found that the concentration of the oxidative gas in the second shielding gas preferably ranges from about 1600 vol. ppm to about 6000 vol. ppm, and more preferably from about 3000 vol. ppm to about 5000 vol. ppm. Such concentrations provide oxygen concentrations in the welded metal portions ranging from about 70 wt. ppm to about 220 wt. ppm. As a result of the above described concentration ranges for the oxidative gas in the second shielding gas and oxygen concentrations in the welded metal portions, it was found that the oxide coating formed on the surface of the welded metal portion preferably has a thickness of about 20 μm or less. Thus, it is even more preferred in the inventive TIG equipment and methods that the concentration of the oxidative gas in the second shielding gas preferably ranges from about 1600 vol. ppm to about 6000 vol. ppm, and more preferably from about 3000 vol. ppm to about 5000 vol. ppm., such that the oxygen concentration in the welded metal portions ranges from about 70 wt. ppm to about 220 wt. ppm as well as the oxide coating formed on the surface of the welded metal portion has a thickness of about 20 μm or less.

Thus, the TIG welding methods of the present invention include generating an electric arc between an electrode and an object to weld the object, wherein a first shielding gas including an inert gas flows toward the welded object surrounding the electrode, a second shielding gas containing an oxidative gas flows toward the welded object along a periphery of the first shielding gas, and a concentration of the oxidative gas in the second shielding gas is set such that the oxygen concentration in the welded metal portion of the welded object is within a range of 70 to 220 wt. ppm.

Other TIG welding methods of the present invention include generating an electric arc between an electrode and an object to weld the object, wherein a first shielding gas including an inert gas flows toward the welded object surrounding the electrode, a second shielding gas containing an oxidative gas flows toward the welded object from at least two sides of the electrodes as viewed in a welding direction, and a concentration of the oxidative gas in the second shielding gas is set such that the oxygen concentration in the welded metal portion of the welded object is within a range of 70 to 220 wt. ppm.

In other TIG welding methods of the present invention, it is preferable that an oxide film formed on a surface of the welded metal portion have a thickness of 20 μm or less.

In other TIG welding methods of the present invention, the welded metal portion of the present invention is produced by using the TIG welding methods of the present invention, wherein the oxygen concentration is within a range of 70 to 220 wt. ppm.

In other TIG welding methods of the present invention, the welded metal portion of the present invention is produced by using the TIG welding methods of the present invention, wherein an oxide film formed on a surface has a thickness of 20 μm or less.

In the present invention, the following effects are obtained.

(1) Since the first shielding gas including an inert gas flows surrounding an electrode, the electrode is protected by the first shielding gas, and can be prevented from being deteriorated by oxidation. Therefore, the welded structure can be obtained with good welding quality.

(2) It is possible to supply the first shielding gas to the central region of the molten pool and to simultaneously supply the second shielding gas containing an oxidative gas to the peripheral region of the molten pool.

Thereby, the molten pool can be supplied with oxygen in a required concentration, and the oxygen concentration in the peripheral region can be higher than that in the central region.

Therefore, in the molten pool, the surface tension in the peripheral region having lower temperature and higher oxygen concentration is smaller, and the surface tension in the central region having higher temperature and lower oxygen concentration is larger. Consequently, inward convection is induced in the molten pool so that the molten pool can be formed deeply.

Therefore, the welded metal portion can be formed so as to reach the deep portion of the welded object.

(3) As compared with conventional welding methods using active flux, slag is hardly generated in the present invention so that a slag removal operation is not required. Meanwhile, fume is also hardly generated during the welding process. Therefore, the welding operation can be easily carried out.

(4) Since the welded metal portion can be formed deeply, occurrence of poor weld-penetration or reduction in welding efficiency can be prevented.

BRIEF DESCRIPTION OF THE DRAWINGS

The accompanying drawings are included to provide a further understanding of the invention, and are incorporated in and constitute a part of the specification. The drawings illustrate embodiments of the invention and, together with the description, serve to explain the principles of the invention.

FIG. 1 is a schematic diagram illustrating the structure of the important parts of the welding equipment according to a first embodiment.

FIG. 2(*b*) is a is a schematic diagram illustrating the state of the molten pool.

FIG. 3(*a*) is a front view of the welding equipment with a part thereof shown in a sectional state.

FIG. 3(*b*) is a cross-sectional view of the welding equipment.

FIG. 5(*a*) is a front view of the welding equipment with a part thereof shown in a sectional state.

FIG. 5(*b*) is a cross-sectional view of the welding equipment.

FIG. 6(*a*) is a front view of the welding equipment with a part thereof shown in a sectional state.

FIG. 6(*b*) is a cross-sectional view of the welding equipment.

FIG. 8(*a*) is a front view of the welding equipment with a part thereof shown in a sectional state.

FIG. 8(*b*) is a cross-sectional view of the welding equipment.

FIG. 9 provides photographs showing a cross-section of the welded metal portion.

Figure 2A:
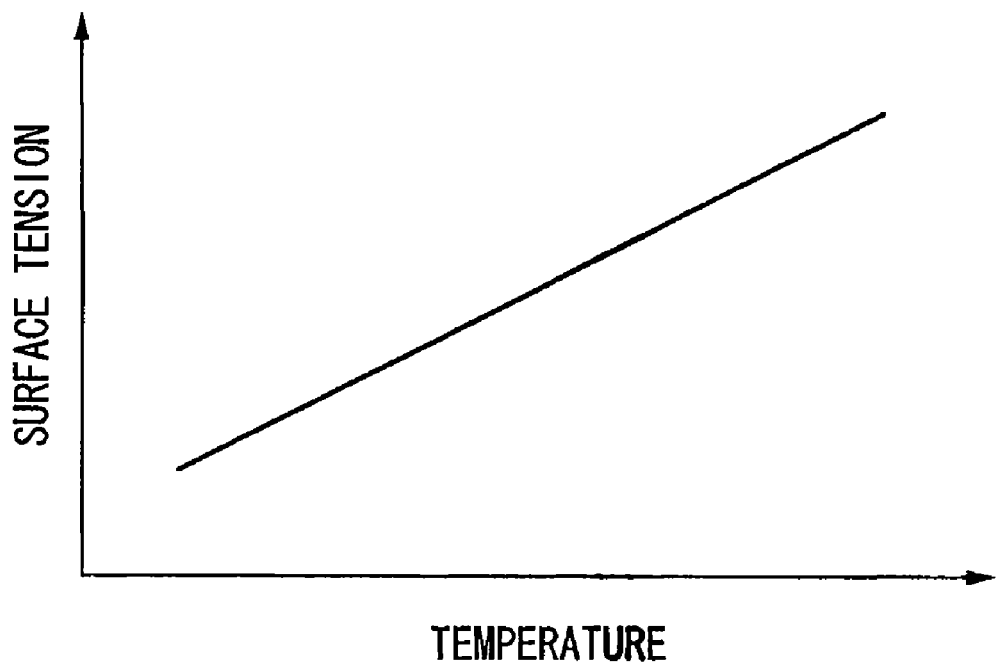
FIG. 2(*a*) is a graph showing the correlation between the surface tension and temperature in the molten pool.

The reference numerals shown in these figures are defined as follows:

A, B, B', C, and C' represent the welding equipment;
1, 11, and 21 represent a torch;
2 represents a tungsten electrode;
3 represents an inner nozzle;
4 represents an outer nozzle;
5, 15, and 25 represents the molten pool;
7 represents an arc;
8 represents the first shielding gas;
9 represents the second shielding gas;
10 represents the base material (welded object);
13 and 23 represents the central nozzle; and
14, 14*a*, 24, and 24*a* represents the side nozzle.

DETAILED DESCRIPTION OF THE INVENTION

The embodiments of the welding equipment used in the welding methods of the present invention are described below referring to the drawings. The following welding equipment includes a welding device, a control device, a gas supply, and welding power, even though they are not shown in the drawings.

First Embodiment

FIG. 1 illustrates the first embodiment of the welding equipment. The TIG welding equipment (A) shown in FIG. 1 is equipped with a torch (1) having a multiple tubular structure that having a tungsten electrode (2) for generating an electric arc (7) between itself and a base material (welded object) (10); a tubular inner nozzle (3) disposed surrounding the tungsten electrode (2); and a tubular outer nozzle (4) disposed surrounding the inner nozzle (3). The base material (10) is, for example, a steel-based material.

The torch (1) is a multiple tubular structure having an inner nozzle (3) disposed at the periphery of the tungsten electrode (2) and an outer nozzle (4) at the periphery of the inner nozzle (3).

The tip (bottom end) of the tungsten electrode (2) is formed more protruding than that of the inner nozzle (3) in the tip direction (downward direction).

The inner nozzle (3) is disposed approximately concentric with the tungsten electrode (2) with a distance from the latter.

The inner nozzle (3) can supply a first shielding gas (8) composed of a high-purity inert gas. The first shielding gas (8) can be argon (Ar) or helium (He), for example.

The outer nozzle (4) is disposed approximately concentric with the inner nozzle (3) with a distance from the latter, while a second shielding gas (9) containing an oxidative gas can be supplied through the gap between the outer nozzle (4) and the inner nozzle (3). The second shielding gas (9) can be a mixed gas obtained by adding an oxidative gas into an inert gas. The oxidative gas can be oxygen ($O_2$) or carbon dioxide ($CO_2$), for example, and the inert gas argon or helium.

The method of welding the base material (10) using the above welding equipment (A) is described as follows.

As shown in FIG. 1, the tungsten electrode (2) serves as a negative electrode, and the base material (10) serves as a positive electrode. A voltage applied between the torch (1) and the base material (10) to induce discharge and generate an electric arc (7). The torch (1) is moved toward the left side of the drawing to melt the base material (10) by the heat from the electric arc (7) to form a molten pool (5), so as to weld the base material (10). Herein, the weld bead is labeled with reference number "6" in the drawing.

During the welding operation, the first shielding gas (8) is supplied from the inner nozzle (3). The first shielding gas (8) flows toward the tip of the inner nozzle (3) surrounding the tungsten electrode (2) and sprayed onto the base material (10) from the tip. The first shielding gas (8) is sprayed onto the central region of the molten pool (5).

At the same time, the second shielding gas (9) containing an oxidative gas is supplied through the gap between the inner nozzle (3) and the outer nozzle (4).

The second shielding gas (9) flows toward the tip of the outer nozzle (4) and sprayed to the base material (10) from the tip.

At the moment, the second shielding gas (9) flows along the periphery of the first shielding gas (8) surrounding the first shielding gas (8), and is sprayed onto the peripheral region (the region located at the periphery of the central region) of the molten pool (5).

In the second shielding gas (9), the concentration of an oxygen-based gas (such as oxygen or carbon dioxide) which is the oxidative gas, is preferably 1600 to 6000 vol. ppm. The concentration of the oxidative gas is preferably 2000 to 6000 vol. ppm, and more preferably 3000 to 5000 vol. ppm.

The use of the second shielding gas (9) containing an oxidative gas allows oxygen to be dissolved in the welded metal portion (5a), while the concentration of the oxidative gas in the second shielding gas (9) is set so that the oxygen concentration in the welded metal portion (5a) is 70 to 220 wt. ppm.

With the above operation, a welded structure having the welded metal portion (5a) is obtained.

An oxide film is also formed on the surface of the welded metal portion (5a), while the thickness of the oxide film is preferably 20 μm or less. If the thickness of the oxide film exceeds the above range, the welded metal portion (5a) tends to be shallow.

The surface tension of a melted metal varies with the temperature or the concentration of dissolved trace impurities like sulfur or oxygen. FIG. 2(a) shows an example of correlation between the surface tension and the temperature of a melted metal, in which sulfur or oxygen is dissolved in the welded metal in certain concentrations. In these examples, the surface tension of the melted metal increases with increasing temperature.

Figure 2B:
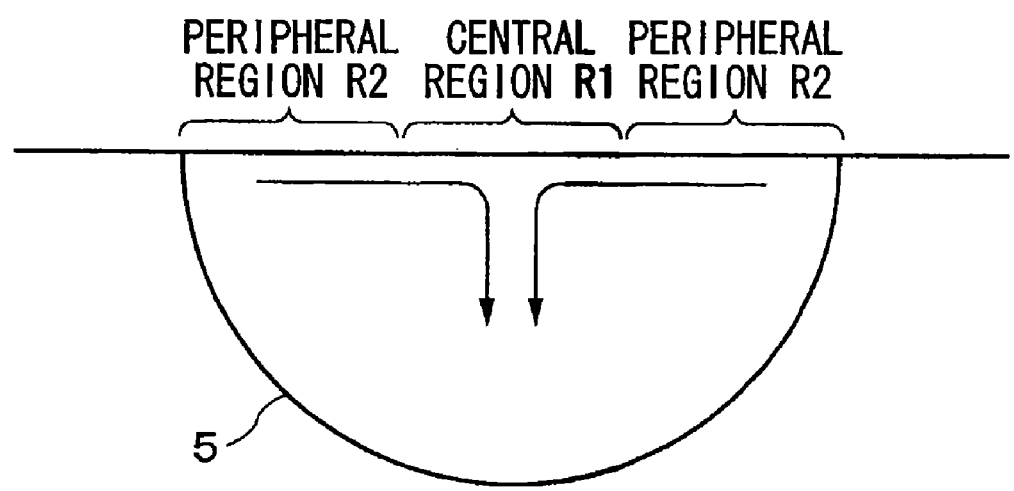

As shown in FIG. 2(b), when the temperature in the peripheral region R2 of the molten pool (5) is lower than that in the central region R1, the surface tension in the peripheral region R2 is smaller than that in the central region R1, causing inward convection in the molten pool (5).

Moreover, even if the temperature is constant, the surface tension decreases with the increase in the concentration of oxygen dissolved in the melted metal.

Because the welding equipment (A) is equipped with a torch (1) having a tubular inner nozzle (3) surrounding the tungsten electrode (2) and a tubular outer nozzle (4) surrounding the inner nozzle (3), the following effects obtained:

(1) Since the first shielding gas (8) flows surrounding the tungsten electrode (2), the tungsten electrode (2) is protected by the first shielding gas (8), and can be prevented from being deteriorated by oxidation.

Therefore, the welded structure can be obtained with good welding quality.

(2) Since the second shielding gas (9) is supplied from the gap between the inner nozzle (3) and the outer nozzle (4), it is possible to supply the first shielding gas (8) to the central region R1 of the molten pool (5) and simultaneously supply the second shielding gas (9) containing an oxidative gas to the peripheral region R2 of the molten pool (5).

Thereby, the molten pool (5) can be supplied with oxygen in a required concentration, and the oxygen concentration in the peripheral region R2 can be higher than that in the central region R1.

Therefore, in the molten pool (5), the surface tension in the peripheral region R2, having lower temperature and higher oxygen concentration, is smaller, and that in the central region R1, having higher temperature and lower oxygen concentration, is larger. Consequently, inward convection is induced in the molten pool (5) so that the molten pool (5) can be formed deeply.

Therefore, the welded metal portion (5a) can be formed so as to reach the deep portion of the base material (10).

(3) As compared with the conventional welding method using active flux, slag is hardly generated in the invention so that a slag removal operation is not required. Meanwhile, fume is also hardly generated during the welding process. Therefore, the welding operation can be easily carried out.

(4) Since the welded metal portion (5a) can be formed deeply, occurrence of poor weld-penetration or reduction in welding efficiency can be prevented.

Second Embodiment

Figure 3A:
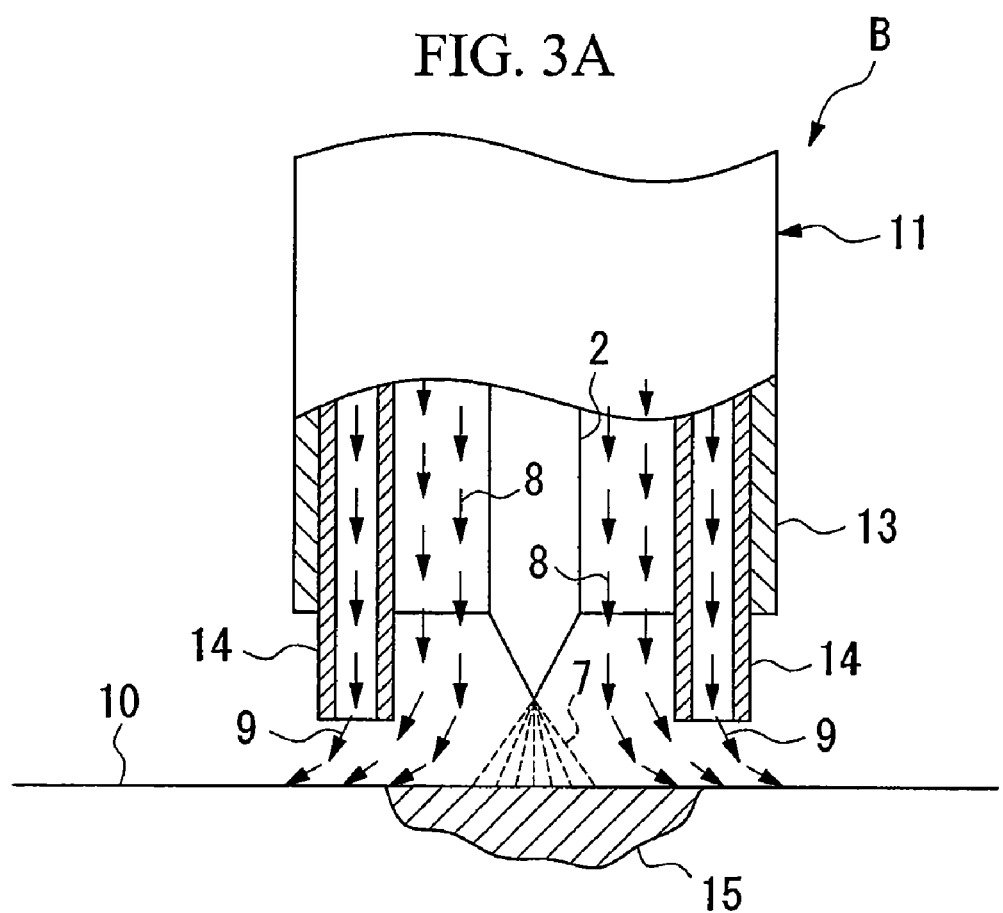
FIG. 3(*a*) and FIG. 3(*b*) are schematic diagrams illustrating the structure of the important parts of the welding equipment according to a second embodiment.

FIG. 3 illustrates the second embodiment of welding equipment. In the drawing and the following description, the parts similar to those in the welding equipment A of FIG. 1 are also labeled with the same reference numbers and the description thereof is not repeated again.

Moreover, the "welding direction" is defined as the moving direction of the torch hereinafter, the "front side" is the side along the welding direction, and the "back side" is the side against the welding direction.

The welding equipment (B) is equipped with a torch (11) that includes a tungsten electrode (2), a tubular central nozzle (13) disposed surrounding the tungsten electrode (2), and side nozzles (14) disposed between the tungsten electrode (2) and the central nozzle (13).

The torch (11) has a structure including a central nozzle (13) disposed at the periphery of the tungsten electrode (2) and side nozzles (14) disposed between the tungsten electrode (2) and the central nozzle (13).

The central nozzle (13) is disposed approximately concentric with the tungsten electrode (2) with a distance from the latter, capable of supplying the first shielding gas (8).

Figure 3B:
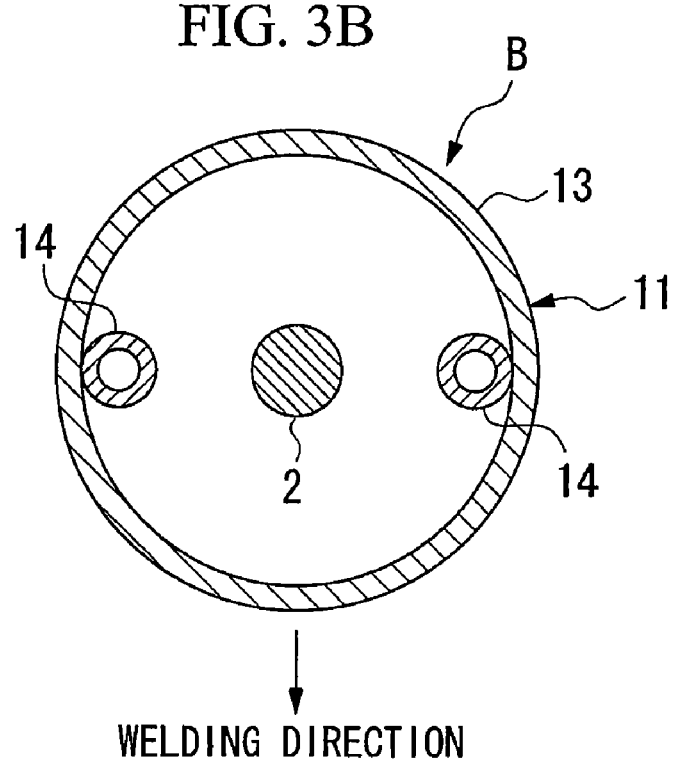

As shown in FIG. 3(b), a side nozzle (14) is disposed on each of the two sides of the tungsten electrode (2) along the welding direction.

The side nozzles (14) can supply the second shielding gas (9), and are preferably formed with tips more protruding than that of the central nozzle (13) in the tip direction.

Moreover, the side nozzles (14) alternatively disposed at least with their tips on sides of the tungsten electrode (2) without directly spraying the second shielding gas (9) onto the weld bead.

Figure 4:
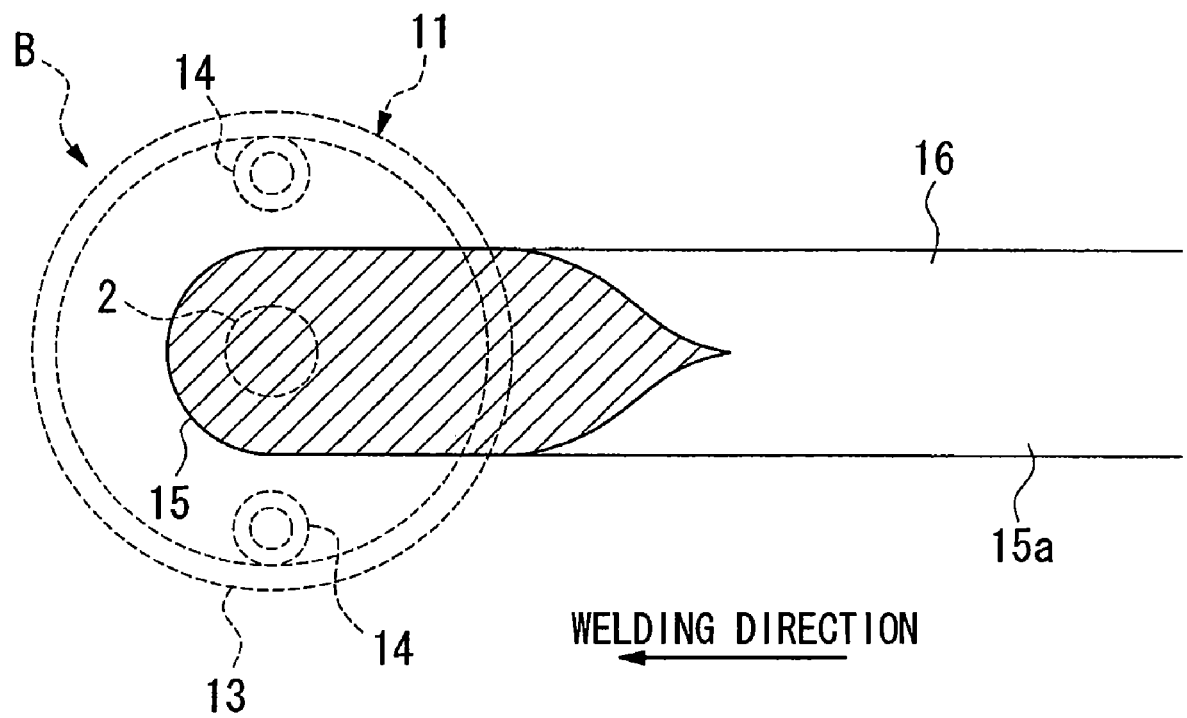
FIG. 4 is a planar view of a welded object obtained by using the welding equipment shown in FIG. 3.

As shown in FIGS. 3 and 4, when the welding equipment (B) is being used to weld the base material (10), the torch (11) is moved to melt the base material (10) by the electric arc (7) to form a molten pool (15), so as to weld the base material (10). The weld bead is labeled with a reference number "16" in the drawing.

During the welding operation, the first shielding gas (8) is supplied from the central nozzle (13). The first shielding gas (8) flows toward the tip of the central nozzle (13) surrounding the tungsten electrode (2) and sprayed onto the base material (10) from the tip.

At the same time, the second shielding gas (9) is supplied from the side nozzles (14). The second shielding gas (9) flows toward the tips of the side nozzles (14) and sprayed onto the base material (10) from the tips.

Since the second shielding gas (9) flows along the periphery of the first shielding gas (8) and sprayed on side portions of the peripheral region of the molten pool (15), the second shielding gas (9) is not supplied to the central region even if the torch (11) is moved in high speed. Thereby, a welded structure having the welded metal portion (15a) is obtained.

Since the welding equipment (B) is equipped with a torch (11), including a tubular central nozzle (13) disposed surrounding the tungsten electrode (2) and side nozzles (14) disposed between the tungsten electrode (2) and the central nozzle (13), the tungsten electrode (2) can be protected from being deteriorated by oxidation, as in the case using the welding equipment (A) illustrated in FIG. 1. Therefore, the welded structure can be obtained with good welding quality.

Moreover, since the second shielding gas (9) containing an oxidative gas can be supplied to the peripheral region of the molten pool (15), the inward convection in the molten pool (15) is enhanced so that the molten pool (15) can be formed deeply. Therefore, the welded metal portion (15a) can be formed deeply in the base material (10).

Furthermore, using the welding equipment (B) makes the welding performance easier and improves the welding efficiency.

In this invention, one or more side nozzles can further be disposed on the front side and/or the back side of the electrode.

Figure 5A:
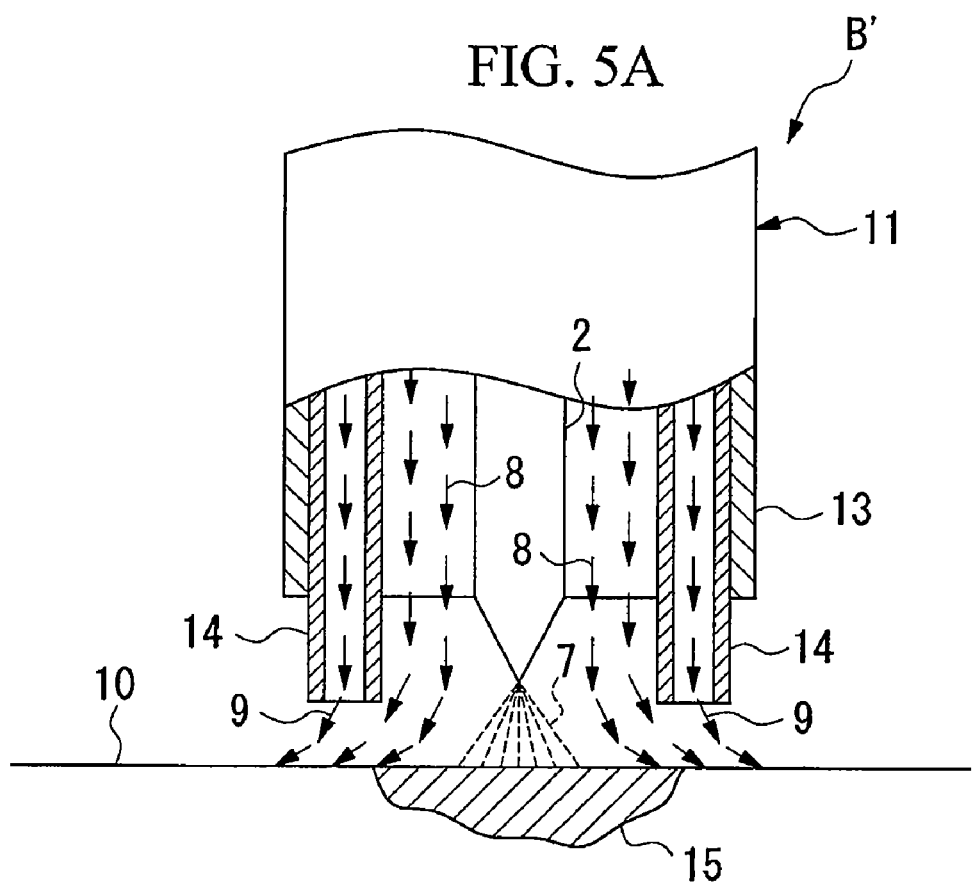
FIG. 5(*a*) and FIG. 5(*b*) are schematic diagrams illustrating the structure of the important parts of the welding equipment according to a third embodiment.
Figure 5B:
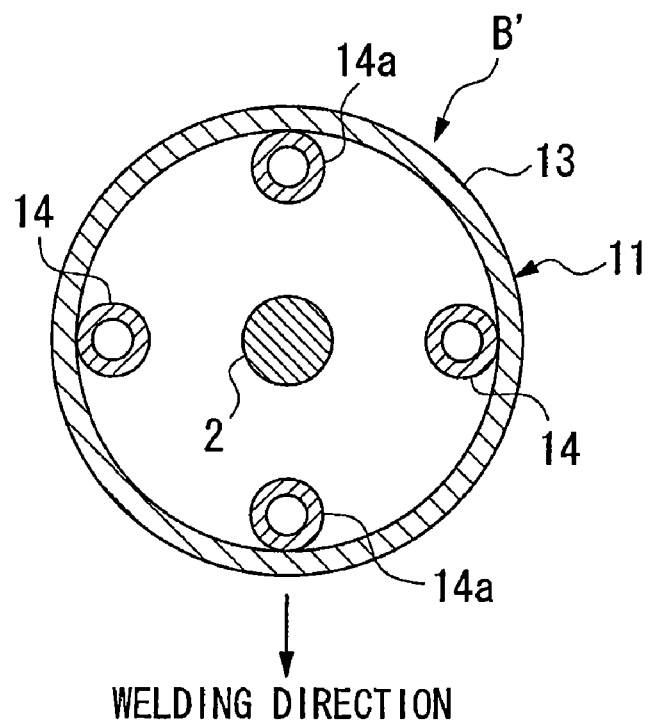

FIG. 5 illustrates the third embodiment of welding equipment, in which the welding equipment (B') differs from the welding equipment (B) illustrated in FIG. 3 in that two more side nozzles (14a) and (14b) are further included. The two side nozzles (14a) and (14b) are disposed on the front side and the back side, respectively, of the tungsten electrode (2) between the tungsten electrode (2) and the central nozzle (13), capable of supplying the second shielding gas (9).

Figure 6A:
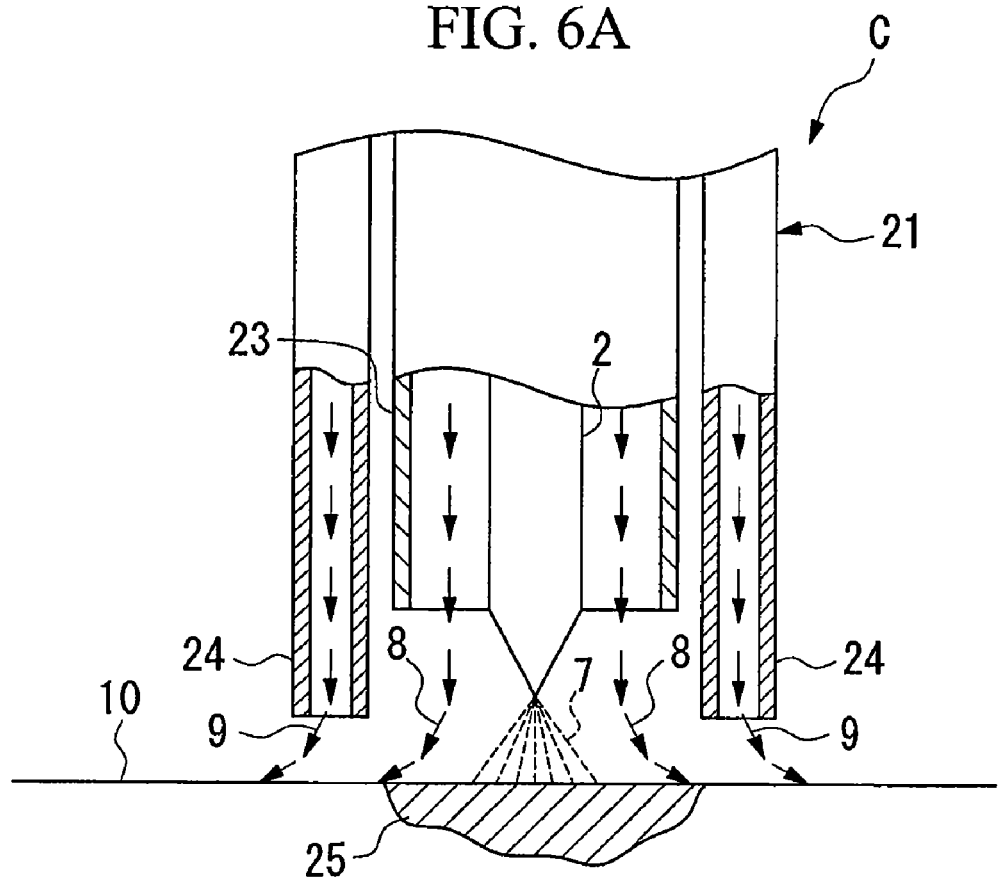
FIG. 6(*a*) and FIG. 6(*b*) are schematic diagrams illustrating the structure of the important parts of the welding equipment according to a fourth embodiment.
Figure 6B:
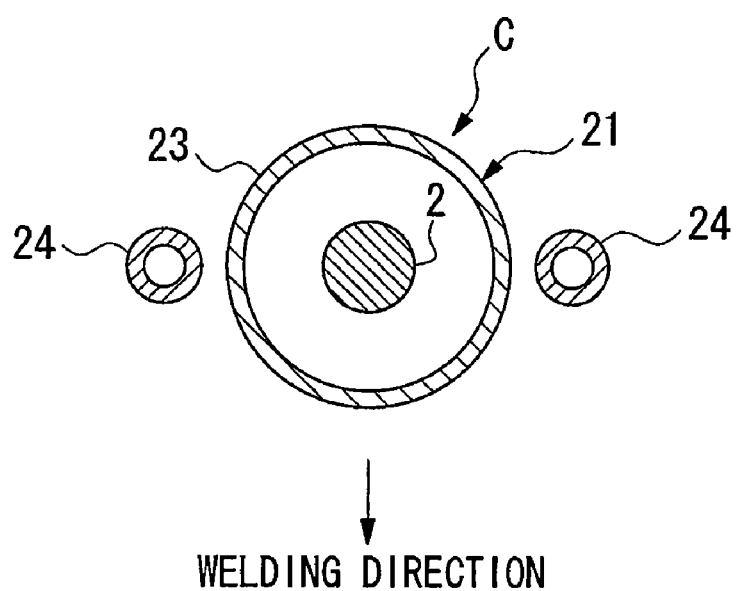

FIG. 6 illustrates the fourth embodiment of welding equipment. The welding equipment (C) differs from the welding equipment (B) illustrated in FIG. 3 in that the side nozzles (24) are disposed outside the central nozzle (23).

The welding equipment is equipped with a torch (21), including a tungsten electrode (2), a tubular central nozzle (23) disposed surrounding the tungsten electrode (2), and side nozzles (24) disposed outside the central nozzle (23).

The side nozzles (24) are arranged so that each of the two sides of the tungsten electrode (2) as viewed in the welding direction, are disposed with a side nozzle (24), and are preferably formed with tips more protruding than that of the central nozzle (23) in the tip direction. The side nozzles (24) can supply the second shielding gas (9).

Moreover, the side nozzles (24) alternatively disposed at least with their tips on sides of the tungsten electrode (2) without directly spraying the second shielding gas (9) onto the weld bead. Furthermore, the welding direction is varied with the arrangement of the welded part, but the side nozzles (24) are constantly kept on two sides of the tungsten electrode (2) as view in the welding direction even when the welding direction is changed by 90 degrees, for example.

Figure 7:
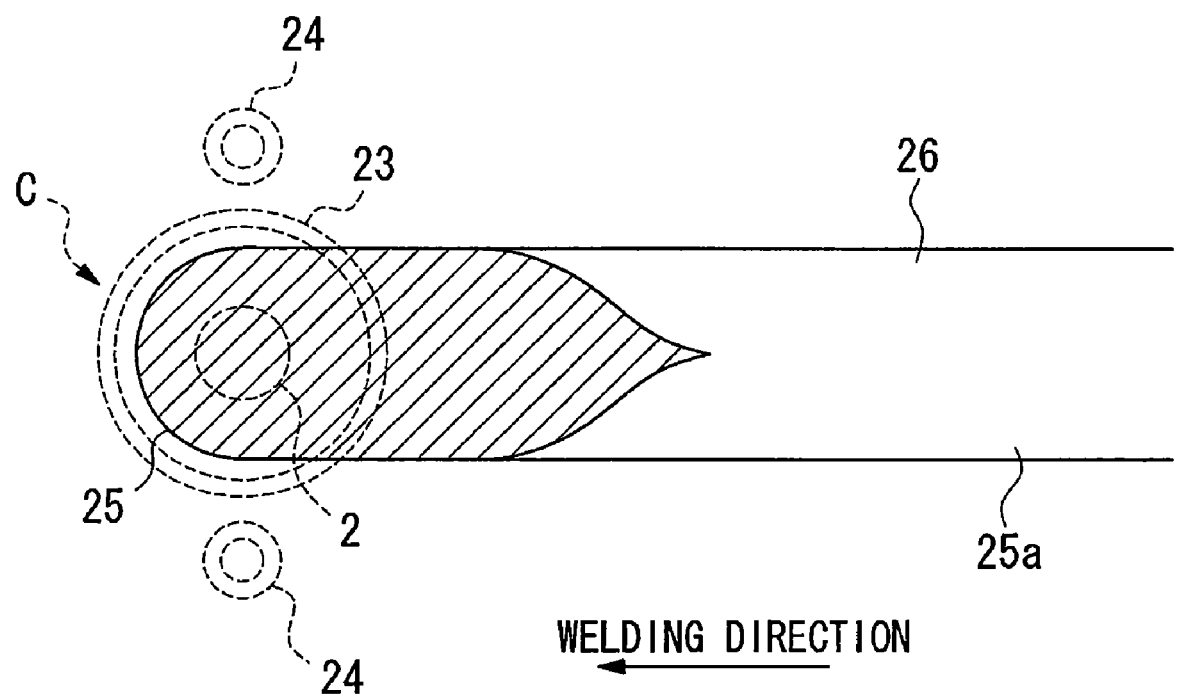
FIG. 7 is a planar view of a welded object obtained by using the welding equipment shown in FIG. 6.

As shown in FIG. 7, when the welding equipment (C) is being used to weld the base material (10), the electric arc (7) melts the base material (10) to form a molten pool (25) so that the base material (10) can be welded. The weld bead is labeled with a reference number "26" in FIG. 7.

During the welding operation, the first shielding gas (8) is supplied from the central nozzle (23). The first shielding gas (8) flows toward the tip of the central nozzle (23) surrounding the tungsten electrode (2) and sprayed onto the base material (10) from the tip.

At the same time, the second shielding gas (9) is supplied from the side nozzles (24). The second shielding gas (9) flows toward the tips of the side nozzles (24) and sprayed onto the base material (10) from the tips.

More specifically, the second shielding gas (9) is sprayed onto two side portions of the peripheral region of the molten pool (25). Thereby, a welded structure having the welded metal portion (25a) is obtained.

Since the welding equipment (C) is equipped with a torch (21), including a tubular central nozzle (23) disposed surrounding the tungsten electrode (2) and side nozzles (24) disposed outside the central nozzle (23), the tungsten electrode (2) can be protected from being deteriorated by oxidation, as in the case using the welding equipment (A) illustrated in FIG. 1. Therefore, the welded structure can be obtained with good welding quality.

Moreover, since the second shielding gas (9) containing an oxidative gas is supplied to the peripheral region of the molten pool (25), the inward convection in the molten pool (25) is enhanced so that the molten pool (25) can be formed deeply. Therefore, the welded metal portion (25a) can be formed deeply in the base material (10). Furthermore, using the welding equipment (C) makes the welding performance easier and improves the welding efficiency.

In addition, since the side nozzles (24) are disposed outside the central nozzle (23), the second shielding gas (9) can be supplied certainly along the periphery of the first shielding gas (8).

In this invention, one or more side nozzles can be further disposed on the front and/or the back side of the electrode.

Figure 8A:
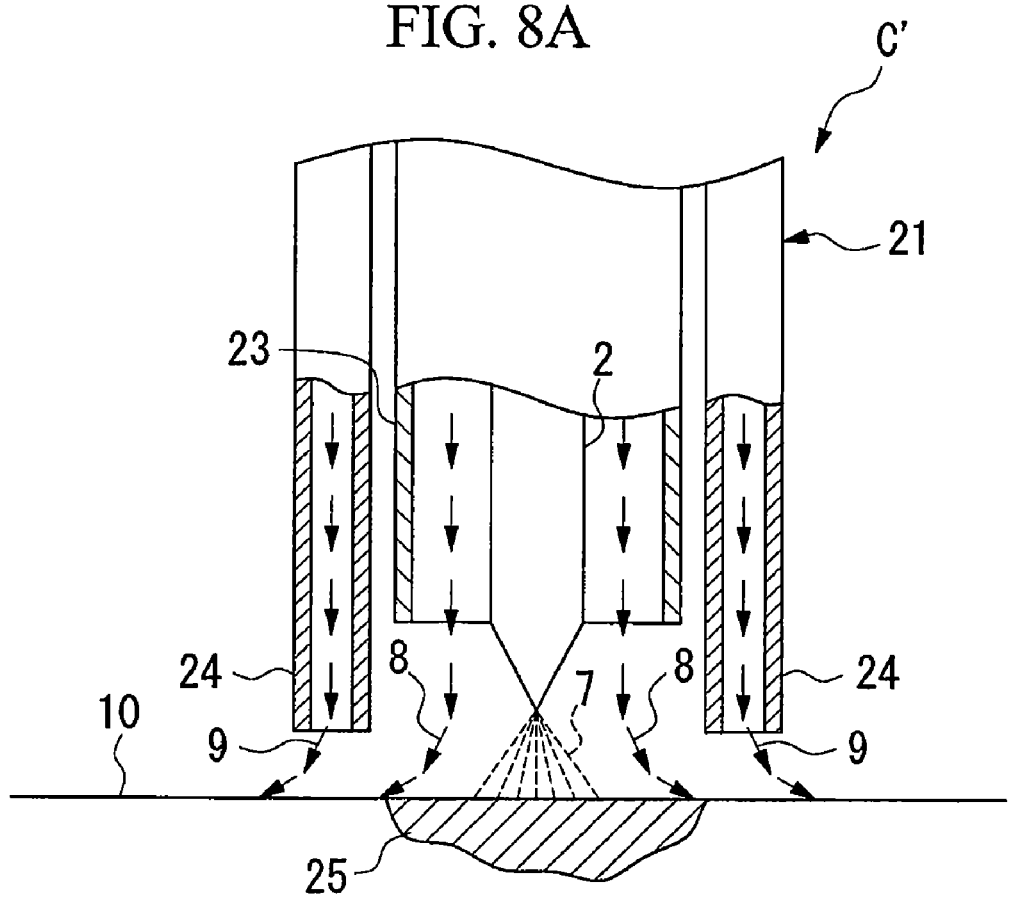
FIG. 8(*a*) and FIG. 8(*b*) are schematic diagrams illustrating the structure of the important parts of the welding equipment according to a fifth embodiment.
Figure 8B:
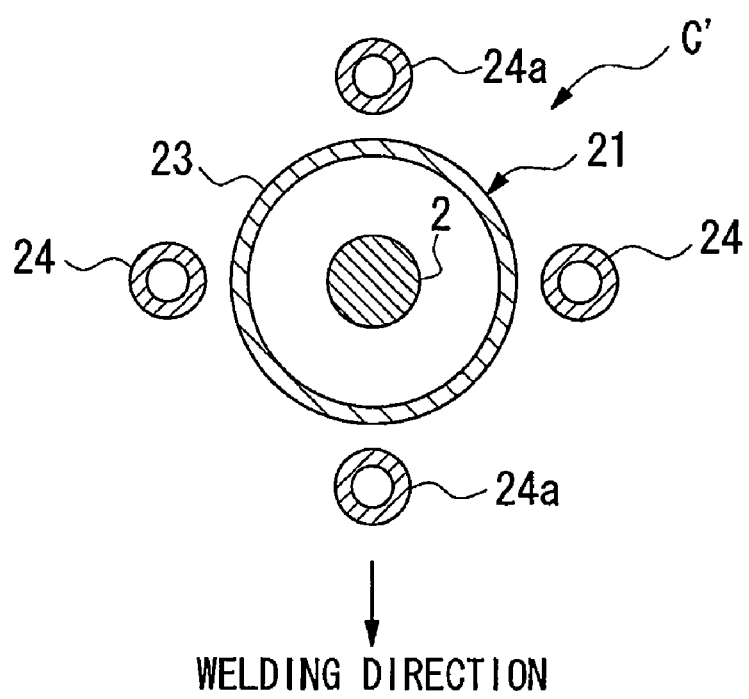

FIG. 8 illustrates the fifth embodiment of welding equipment, in which the welding equipment (C') differs from the welding equipment (C) in FIG. 6 in that two more side nozzles (24a), (24a) are further included. The two side nozzles (24a), (24a) are disposed on the front side and the back side, respectively, of the tungsten electrode (2) outside the central nozzle (23), capable of supplying the second shielding gas (9).

Moreover, in the above welding equipment (B), (B'), (C) or (C'), the side nozzles (14) or (24) are not necessarily disposed exactly on two sides of the tungsten electrode (2), and their positions may deviate forward or backward.

EXAMPLES

Some examples of this invention are described as follows. In these examples, SUS304-type stainless steel having low sulfur concentration was used as the base material (10). The compositional components of the stainless steel are listed in Table 1.

TABLE 1

| | Component | | | | | | | |
|---|---|---|---|---|---|---|---|---|
| | C | Si | Mn | Ni | Cr | P | S | O | Fe |
| Amount (wt %) | 0.06 | 0.44 | 0.96 | 8.19 | 18.22 | 0.027 | 0.001 | 0.0038 | remains |

Test 1

The following welding tests were performed by using the welding equipment (A) illustrated in FIG. 1.

As the first shielding gas (8) argon was used, and as the second shielding gas (9), a mixed gas was used, which was obtained by adding oxygen ($O_2$) as an oxidative gas into argon as an inert gas. Some welding tests of the base material (10) were performed under the above conditions, and then the cross sections of the welded metal portions (5a) were observed.

In the welding tests, the oxygen concentration in the second shielding gas (9) was within the range of 1000 to 9000 vol. ppm, and the flow rate of the second shielding gas (9) was 10 L/min or 20 L/min.

Figure 10:
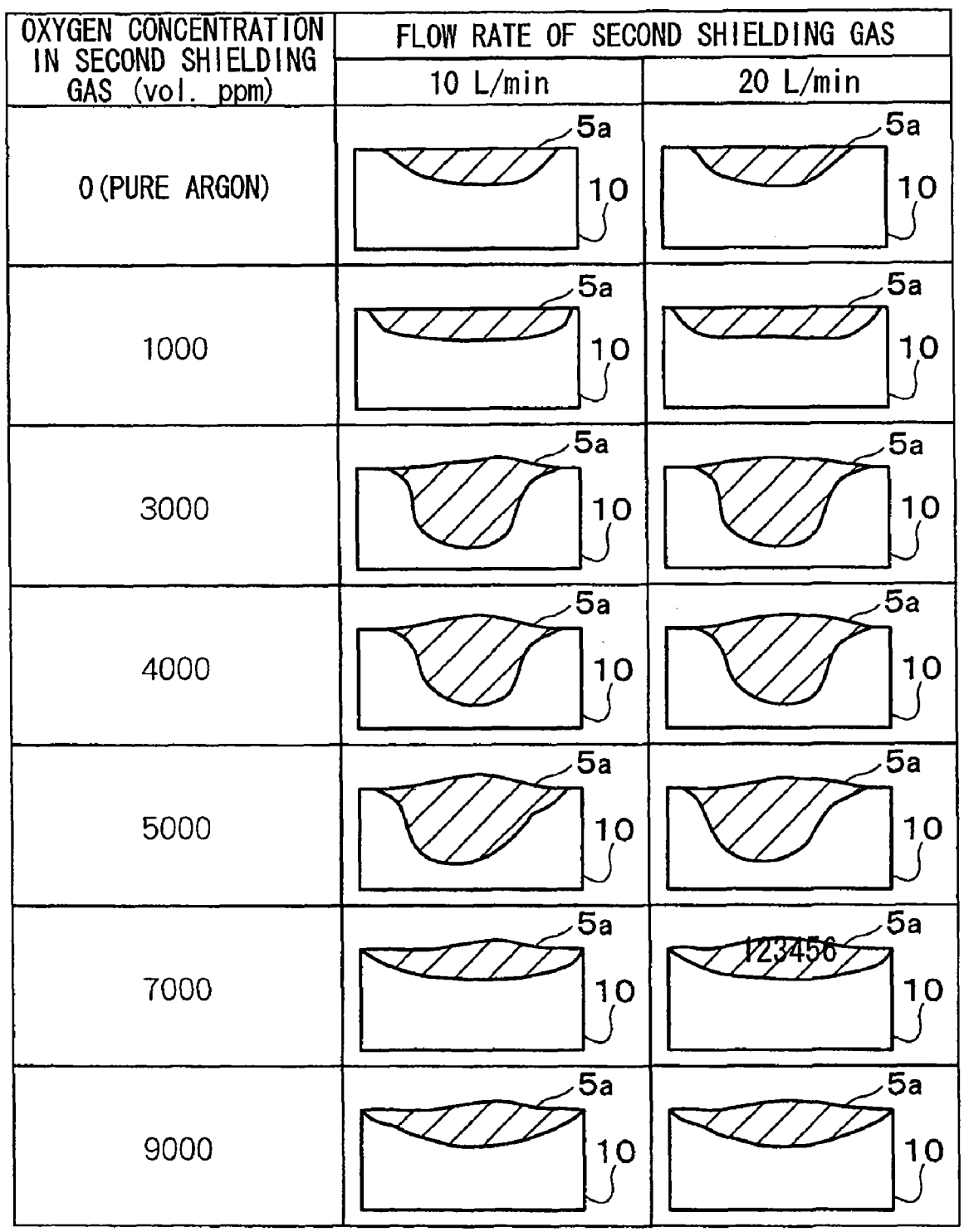
FIG. 10 is a schematic diagram illustrated on the basis of the photographs shown in FIG. 9.

FIG. 9 and FIG. 10 show the cross section of the welded metal portion (5a) obtained in the each test. FIG. 9 is the photographs of the welded metal portion (5a), and FIG. 10 is a schematic diagram illustrated on the basis of the photographs shown in FIG. 9.

For comparison, the test result obtained by using pure argon instead of the second shielding gas (9) is also included in these figures. The other welding conditions are listed in Table 2.

| Item | Condition |
|---|---|
| Type of electrode | DCEN, W-2% ThO$_2$ (tungsten electrode containing 2% of thorium) |
| Diameter of electrode | 1.6 mm |
| Tip angle of electrode | 60° |
| Shielding gas | Ar gas, O$_2$/Ar mixed gas or CO$_2$/Ar |

-continued

| Item | Condition |
|---|---|
| | mixed gas |
| Flow rate of gas | 10 L/min or 20 L/min |
| Arc length | 3 mm |
| Bead length | 50 mm |
| Welding time | 3 seconds |
| Welding current | 160 A |
| Welding speed | 2 mm/sec |

As shown in FIG. 9 and FIG. 10, the welded metal portion (5a) could be formed more deeply in the tests using the second shielding gas (9) containing oxygen, as compared with the tests using pure argon (oxygen concentration: 0 vol. ppm) instead of the second shielding gas (9).

Moreover, when the oxygen concentration in the second shielding gas (9) was within the range of 1600 to 6000 vol. ppm (especially within the range of 2000 to 6000 vol. ppm, more especially within the range of 3000 to 5000 vol. ppm), the welded metal portion (5a) was formed deeply.

When the oxygen concentration was 1000 vol. ppm or less, there were the tendencies in that the weld-penetration was shallow and that the bottom part of the welded metal portion (5a) was flat.

When the oxygen concentration was 7000 vol. ppm or more, the bottom part of the welded metal portion (5a) was not flat but round-shaped, while the weld-penetration was shallow in the same way as the case where the oxygen concentration was 1000 vol. ppm or less.

The following presumption can be reasonable as to the effect of the oxygen concentration in the second shielding gas (9) on the shape of the welded metal portion (5a).

The shape difference of the welded metal portion (5a) between the case where the oxygen concentration is low (1000 vol. ppm or less) and the case where the oxygen concentration is high (7000 vol. ppm or more) indicates that the reasons of the shallow weld-penetration are different between the case of the low oxygen concentration and the case of the high oxygen concentration.

In the case where the oxygen concentration is low, the surface tension in the central region having higher temperature is small, and outward convection is induced in the molten pool. Therefore, the bottom part of the welded metal portion (5a) is formed flatly.

Meanwhile, in the case where the oxygen concentration is high, the surface tension in the central region is large, and inward convection is induced in the molten pool. Therefore, the central portion is relatively deep; that is, the bottom part of the welded metal portion (5a) with a round-shape is formed. However, the oxide film on the surface become so thick that the convection is inhibited. Therefore, the weld-penetration does not become so deep.

Accordingly, the higher oxygen concentration is, the deeper the weld-penetration tends to be since the inward convection is accelerated. However, when the oxygen concentration is too high, the weld-penetration becomes difficult to be deep. Therefore, when the oxygen concentration is within the aforementioned range, the welded metal portion (5a) can be formed deeply.

Figure 11A:
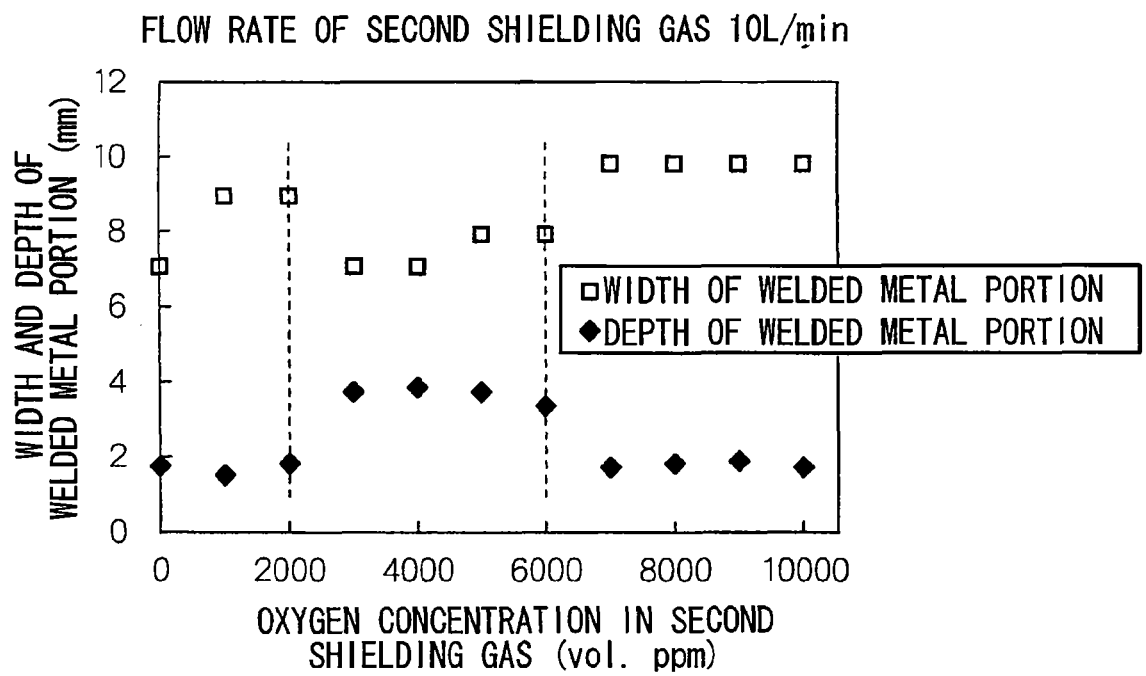
FIG. 11(*a*), FIG. 11(*b*), FIG. 12(*a*) and FIG. 12(*b*) are graphs showing the results of Tests.
Figure 11B:
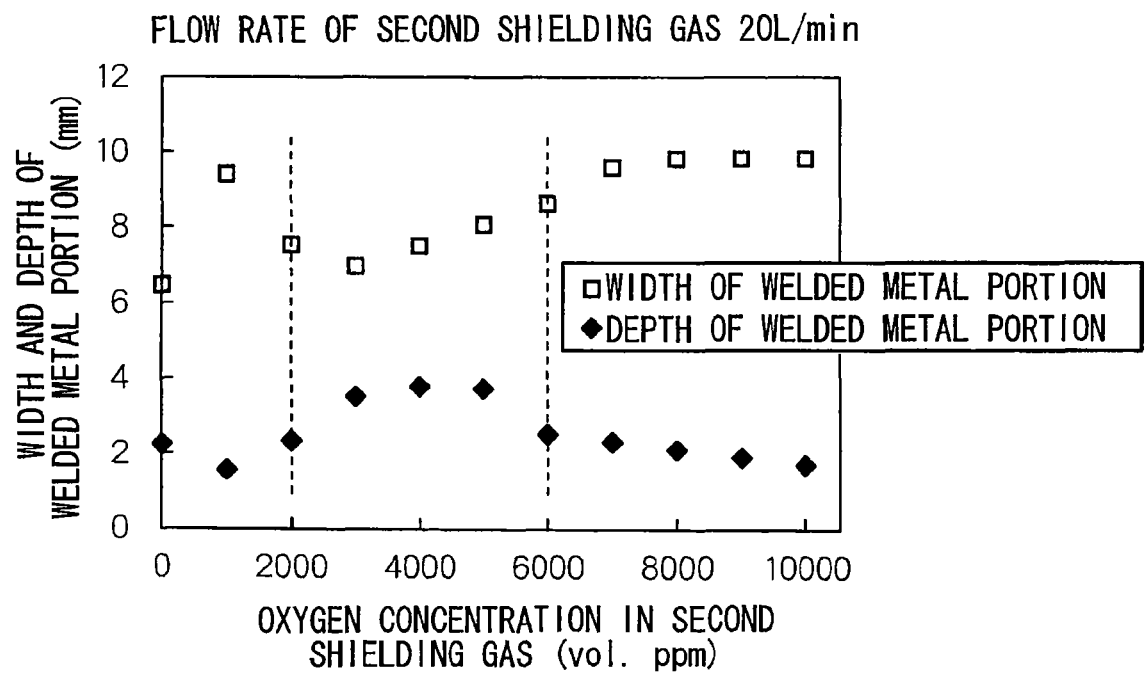

FIG. 11 is the graph showing the correlation between the oxygen concentration in the second shielding gas (9) and the dimensions of the welded metal portion (5a), in which FIG. 11(a) or FIG. 11(b) shows the results when the flow rate of the second shielding gas (9) was 10 or 20 L/min, respectively.

It was found from this figure that the width of the weld bead (6) was small, and the welded metal portion (5a) was formed deeply when the oxygen concentration in the second shielding gas (9) was 1600 to 6000 vol. ppm (particularly 2000 to 6000 vol. ppm, preferably 3000 to 6000 vol. ppm, more preferably 3000 to 5000 vol. ppm). The comparison was made with the cases where the oxygen concentration was under 1000 vol. ppm or above 7000 vol. ppm.

Figure 12A:
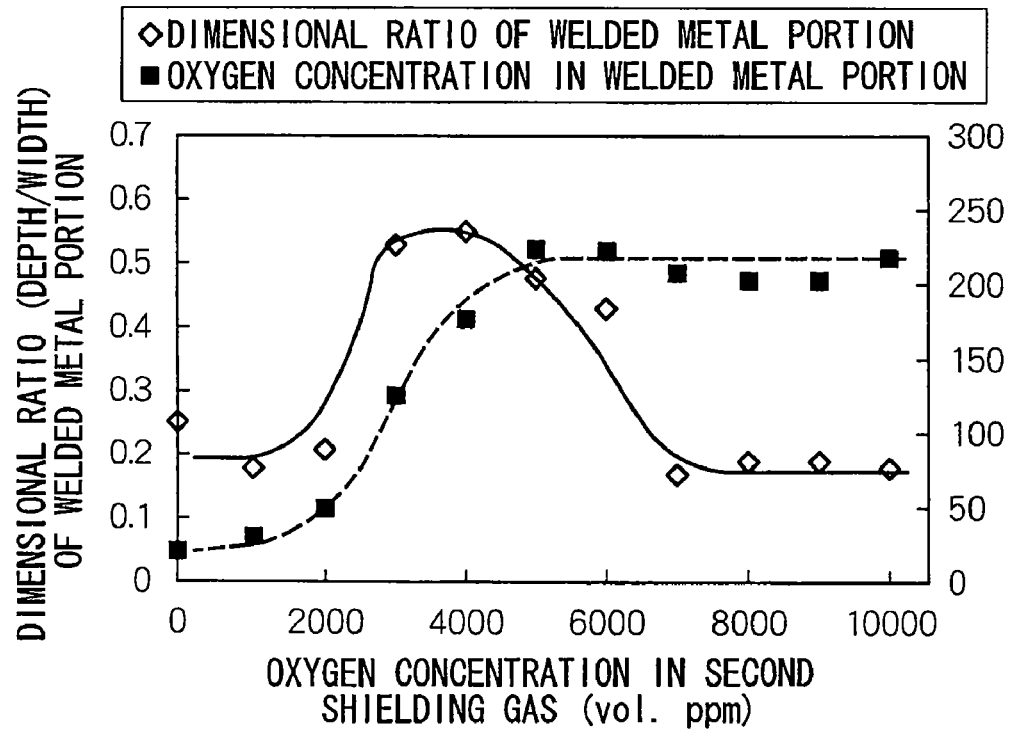
Figure 12B:
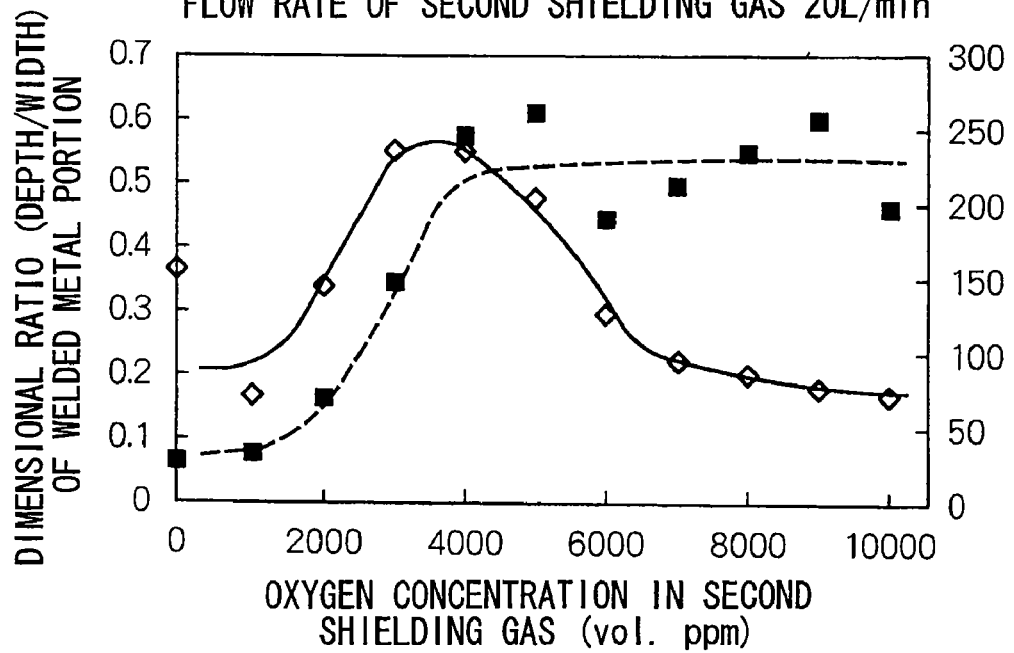

FIG. 12 is the graph showing the correlation between the oxygen concentration in the second shielding gas (9) and the dimensional ratio and the oxygen content (wt. ppm) of the welded metal portion (5a), in which FIG. 12(a) or FIG. 12(b) shows the results when the flow rate of the second shielding gas (9) is 10 or 20 L/min, respectively. The dimensional ratio of the welded metal portion (5a) is defined as the ratio of depth (D) to width (W) of the welded metal portion (5a).

It was found from this figure that the dimensional ratio of the welded metal portion (5a) was higher when the second shielding gas (9) containing oxygen is used, as compared with the cases using pure argon gas.

It was also found that the dimensional ratio of the welded metal portion (5a) was relatively high when the oxygen concentration in the second shielding gas (9) was within the range of 1600 to 6000 vol. ppm (particularly 2000 to 6000 vol. ppm, preferably 3000 to 5000 vol. ppm).

As shown in FIG. 12, the oxygen concentration in the welded metal portion (5a) increased with increasing the oxygen concentration in the second shielding gas (9). The oxygen concentration in the welded metal portion (5a) reached about 200 wt. ppm when the oxygen concentration in the second shielding gas (9) was about 5000 vol. ppm, and was approximately a constant (220 wt. ppm) when the oxygen concentration in the second shielding gas (9) exceeded about 6000 vol. ppm.

The dimensional ratio of the welded metal portion (5a) was relatively high when the oxygen concentration in the welded metal portion (5a) was 70 to 220 wt. ppm (especially 70 to 200 wt. ppm), but the welded metal portion (5a) got shallow when the oxygen concentration was beyond the range. This is because the thickness of the oxide film formed on the surface of the weld bead is overly large.

Test 2

The following welding tests which welded the base material (10) were performed by using a mixed gas of carbon dioxide ($CO_2$) and argon as the second shielding gas (9), and then the cross sections of the welded metal portions (5a) were observed. The flow rate of the second shielding gas was 10 L/min. The other experimental conditions were the same as those in Example 1.

Figure 13:
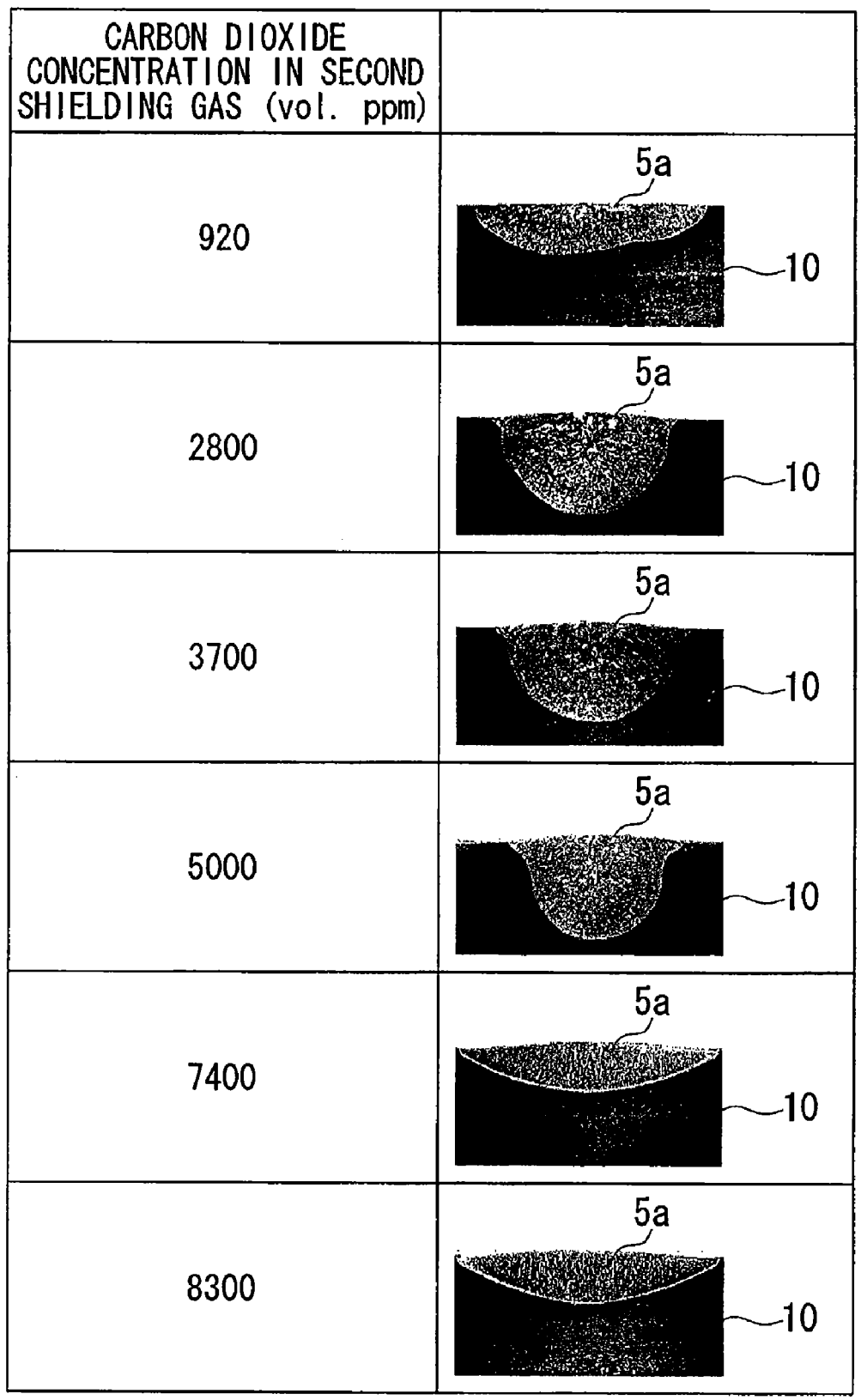
FIG. 13 provides photographs showing the cross-section of the welded metal portion.
Figure 14:
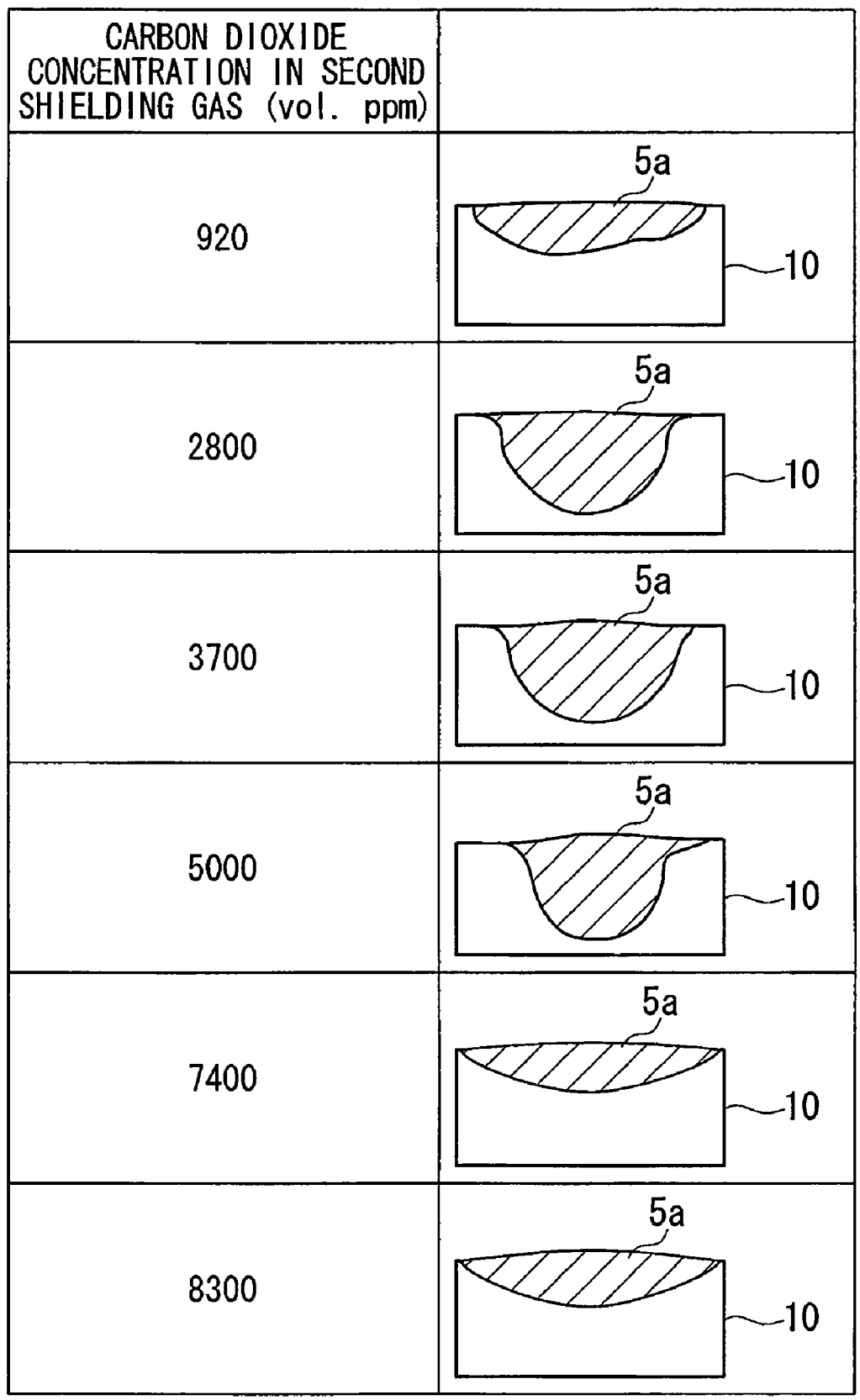
FIG. 14 is a schematic diagram illustrated on the basis of the photographs shown in FIG. 13.

FIG. 13 and FIG. 14 show the cross section of the welded metal portion (5a). FIG. 13 is the photographs of the welded metal portion (5a), and FIG. 14 is a schematic diagram illustrated on the basis of the photographs shown in FIG. 13.

As shown in these figures, when the carbon dioxide concentration in the second shielding gas (9) was within the range of 1600 to 6000 vol. ppm (especially within the range of 2000 to 6000 vol. ppm, more especially within the range of 3000 to 5000 vol. ppm), the welded metal portion (5a) was formed deeply.

Figure 15:
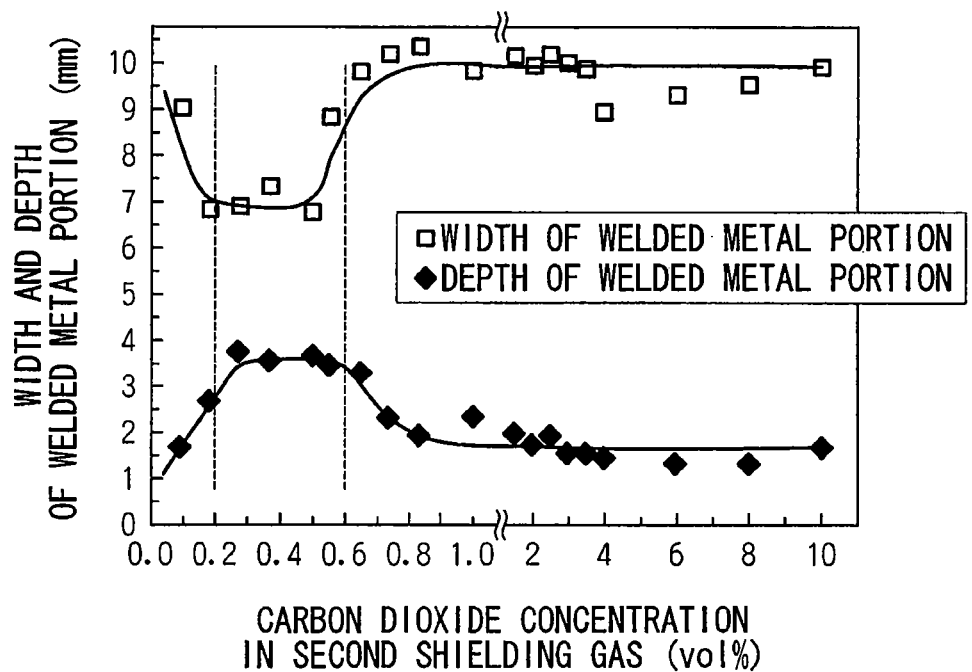
FIG. 15 to FIG. 20 provides graphs showing the results of Tests.

FIG. 15 is the graph showing the correlation between the carbon dioxide concentration in the second shielding gas (9) and the dimensions of the welded metal portion (5a). As shown in this figure, when the carbon dioxide concentration in the second shielding gas (9) was within the range of 1600 to 6000 vol. ppm (preferably within the range of 2000 to 6000 vol. ppm, more preferably within the range of 3000 to 5000 vol. ppm), the welded metal portion (5a) was formed narrowly and deeply.

Figure 16:
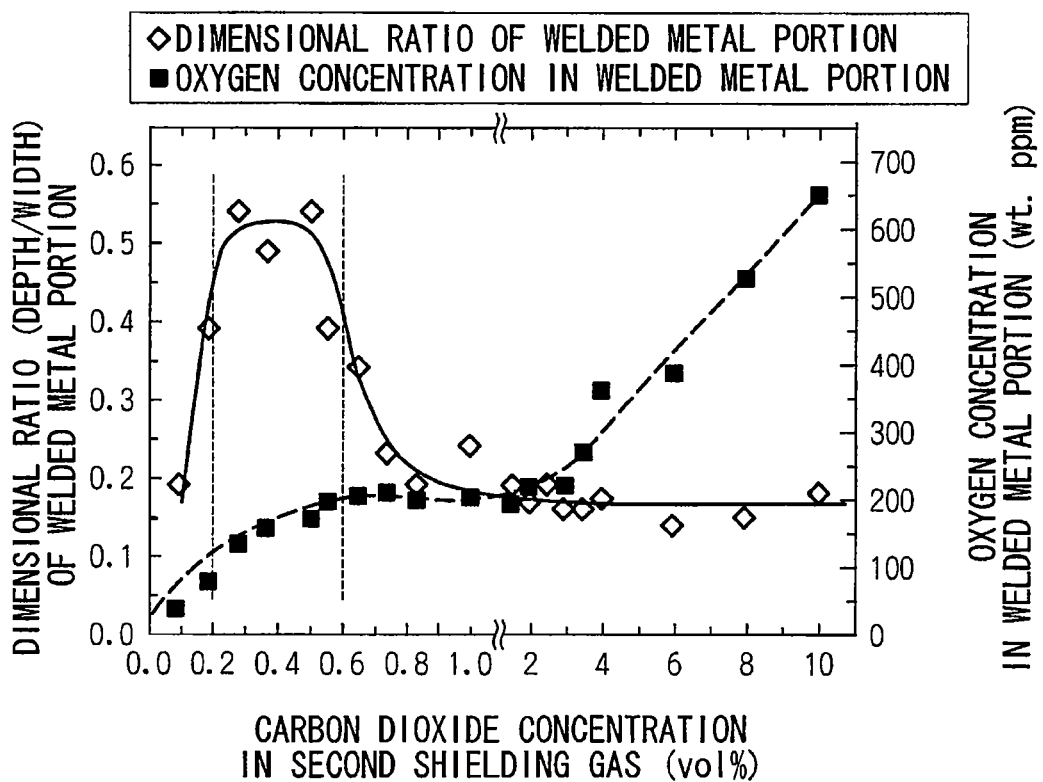

FIG. 16 is the graph showing the correlation between the carbon dioxide concentration in the second shielding gas (9) and the dimensional ratio of the welded metal portion (5a). In this figure, the correlation between the carbon dioxide concentration in the second shielding gas (9) and the oxygen concentration in the welded metal portion (5a) is also shown.

As shown in this figure, when the carbon dioxide concentration in the second shielding gas (9) was within the range of 1600 to 6000 vol. ppm (preferably within the range of 2000 to 6000 vol. ppm, more preferably within the range of 3000 to 5000 vol. ppm), the dimensional ratio of the welded metal portion (5a) became large.

Also, when the oxygen concentration in the welded metal portion (5a) was within the range of 70 to 220 wt. ppm (especially the range of 70 to 200 wt. ppm), the dimensional ratio of the welded metal portion (5a) became large. While, when the oxygen concentration in the welded metal portion (5a) exceeded this range, the welded metal portion (5a) became narrow.

Test 3

The following test was performed to confirm the effect of the oxygen concentration in the welded metal portion (5a) on the shape of the welded metal portion (5a). In this test, a plurality of the base materials (10) made of SUS304-type stainless steel are coated with different oxides (any one of $Cu_2O$, $NiO$, $Cr_2O_3$, $SiO_2$ and $TiO_2$), respectively, in a thickness of 0.1 mm.

A bead-on welding process using argon gas as the second shielding gas was performed as to the oxide-coated portion of each sample, and then the cross sections of the welded metal portions (5a) were observed.

The flow rate of the second shielding gas was 10 L/min, and the other experiment conditions were the same as those in Example 1.

Figure 17:
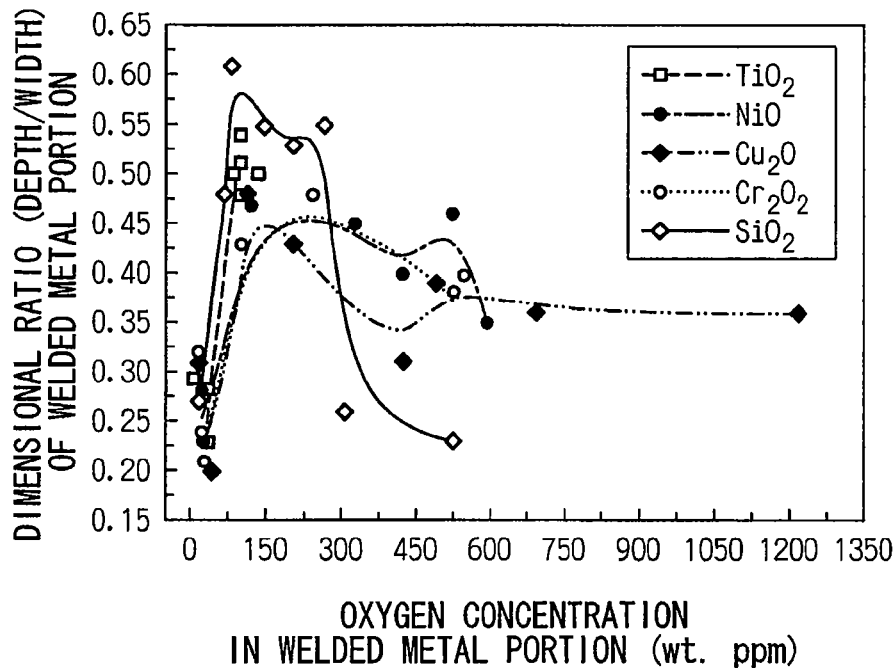

FIG. 17 is the graph showing the correlation between the oxygen concentration in the welded metal portion (5a) and the dimensional ratio (depth/width) thereof.

It was found from this figure that there were the tendencies in that the dimensional ratio of the welded metal portion (5a) became large; that is, the welded metal portion (5a) was formed deeply, when the oxygen concentration in the welded metal portion (5a) was 70 wt. ppm or more regardless of the type of an oxide.

Figure 18:
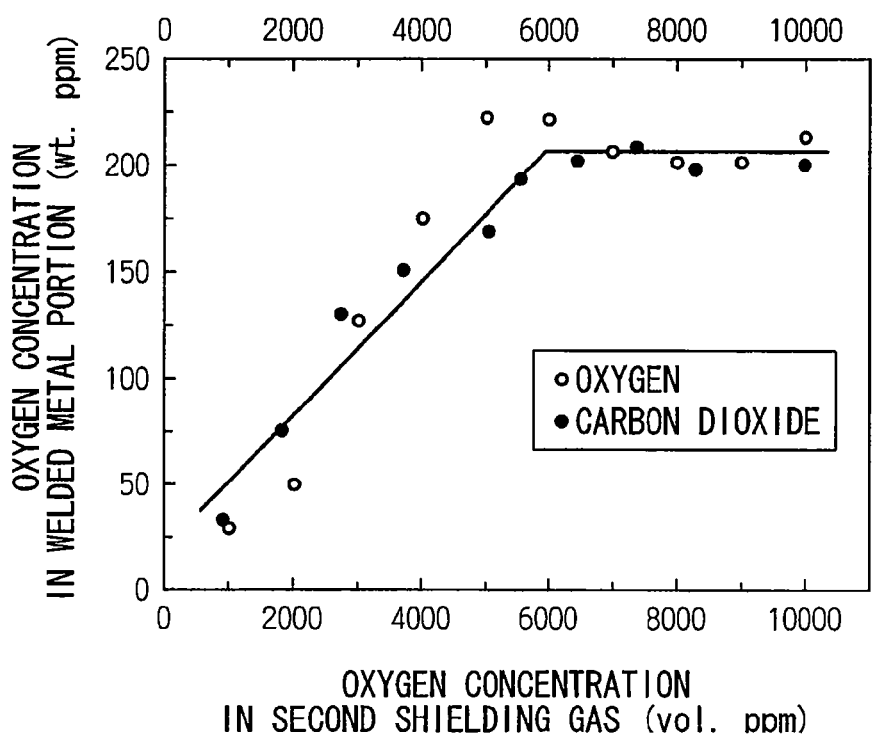

FIG. 18 is the graph showing the correlation between the oxidative gas (oxygen or carbon dioxide) concentration in the second shielding gas (9) and the oxygen concentration in the welded metal portion (5a).

As shown in this figure, the oxygen concentration in the welded metal portion (5a) increased with increasing the oxidative gas concentration in the second shielding gas (9). Also, the oxygen concentration in the welded metal portion (5a) became a constant (about 220 wt. ppm) when the oxidative gas concentration was within the range of about 6000 vol. ppm or more.

On the basis of the results shown in FIG. 12, FIG. 16, and FIG. 17, it can be estimated that the welded metal portion (5a) having a good shape can be formed by setting the composition of the second shielding gas (9) such that the oxygen concentration in the welded metal portion (5a) is within the range of 70 to 220 wt. ppm.

It is found from FIG. 18 that 70 wt. ppm of the oxygen concentration in the welded metal portion (5a) corresponds to 1600 vol. ppm of the oxidative gas concentration in the second shielding gas (9).

Therefore, the oxidative gas concentration in the second shielding gas (9) is preferably adjusted to be within the range of 1600 to 6000 vol. ppm in order to adjust the oxygen concentration in the welded metal portion (5a) to be within the preferable range of 70 to 220 wt. ppm.

Example 4

The welding test was performed in accordance with the Test 1 except for using a mixed gas of oxygen and argon, or a mixed gas of carbon dioxide and argon as the second shielding gas (9).

Figure 19:
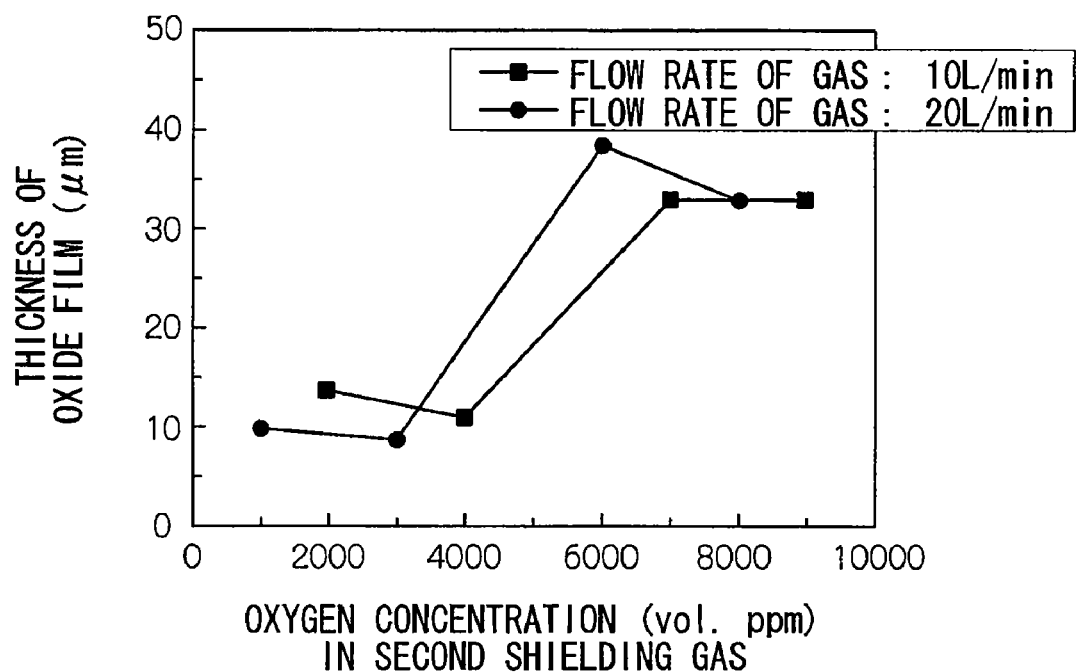

FIG. 19 is the graph showing the correlation between the oxygen concentration in the second shielding gas (9) and the thickness of the oxide film formed on the surface of the welded metal portion (5a) in the case where a mixed gas of oxygen and argon was used as the second shielding gas (9). The flow rate of the second shielding gas (9) was 10 L/min or 20 L/min.

Figure 20:
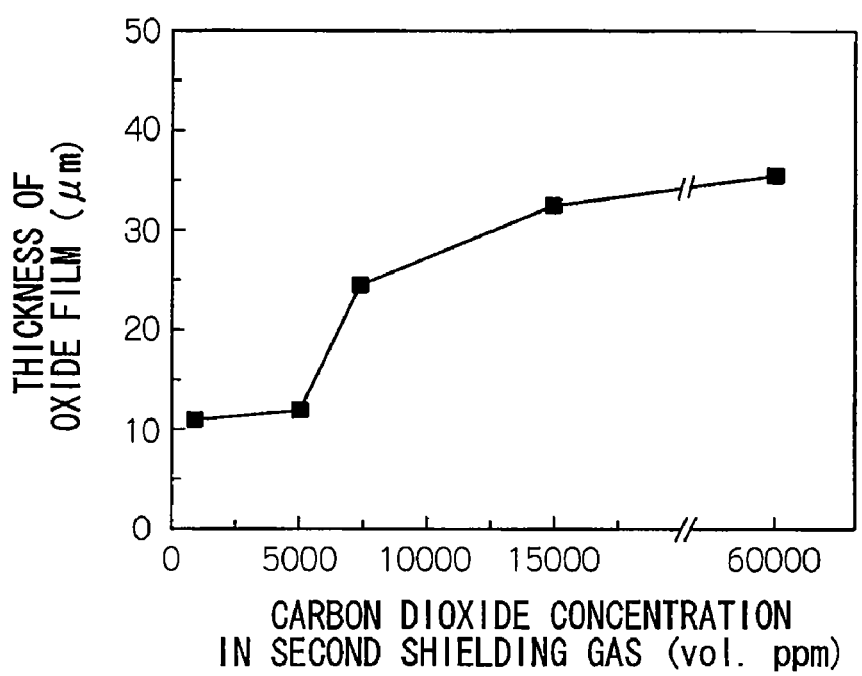

FIG. 20 is a graph showing the correlation between the carbon dioxide concentration in the second shielding gas (9) and the thickness of the oxide film formed on the surface of the welded metal portion (5a) in the case where a mixed gas of carbon dioxide and argon was used as the second shielding gas (9). The flow rate of the second shielding gas (9) was 10 L/min.

As shown in FIG. 19 and FIG. 20, when the oxidative gas concentration exceeds 6000 vol. ppm, the oxide film becomes thick and inhibits the convection in the molten pool (5). Therefore, the welded metal portion (5a) is difficult to be formed deeply. In addition, corrosion resistance is deteriorated, and also the appearance becomes poor.

Therefore, the oxidative gas concentration is preferably 6000 vol. ppm or less, and more preferably 5000 vol. ppm.

Since 6000 vol. ppm of the oxidative gas concentration corresponds to 20 μm of the thickness of the oxide film, it is estimated that the thickness of the oxide film is preferably 20 μm or less.

Test 5

The welding test was performed by using the welding equipment (C) illustrated in FIG. 6 and a mixed gas of carbon dioxide and argon as the second shielding gas (9), without moving the torch (the welding rate: 0 mm/min). The welding time was 60 seconds. The carbon dioxide concentration in the second shielding gas (9) was 5000 vol. ppm, and the flow rate of the second shielding gas (9) was 15 L/min. The other experimental conditions were the same as those in Test 1.

Figure 21:
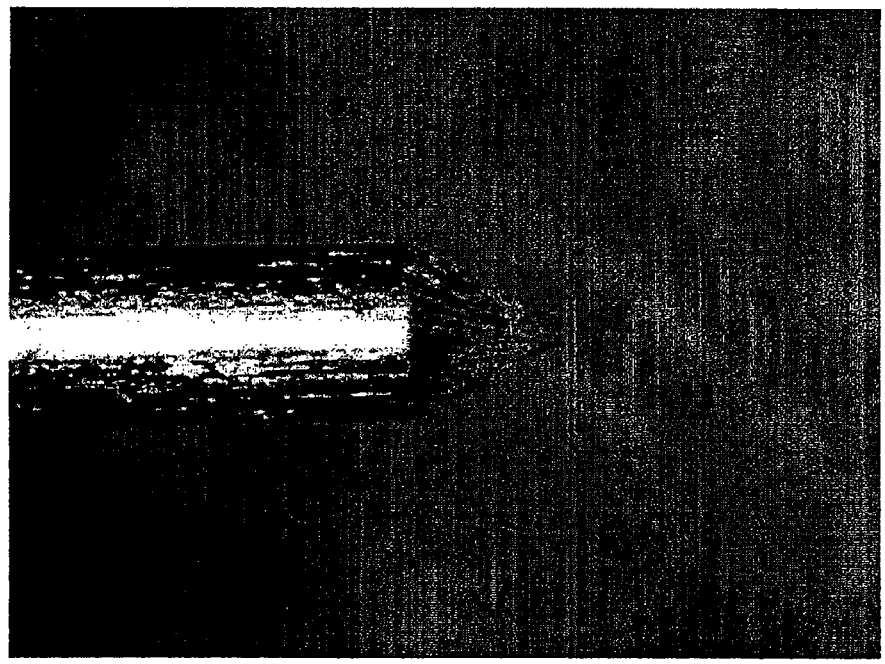
FIG. 21 and FIG. 22 provides photographs showing the electrode after completion of Tests.

FIG. 21 shows the appearance of the electrode after completion of the welding tests. For comparison, the welding test was performed by using a mixed gas of carbon dioxide and argon (the second shielding gas (9)) instead of the first shielding gas (8) supplied from the central nozzle (23).

Figure 22:

FIG. 22 shows the appearance of the electrode after completion of the welding tests.

It was found from FIG. 21 and FIG. 22 that the electrode (2) was deteriorated in the case where a mixed gas of carbon dioxide and argon was used and that the deterioration of the electrode (2) did not appear in the case where argon was used as the first shielding gas (8).

In the case where a mixed gas of oxygen and argon is used as the second shielding gas (9), the shape of the welded metal portion (5a) and the welding efficiency both can be improved by adjusting the oxygen concentration to be 1600 to 6000 vol. ppm in the conditions of the welding current of 160 A and the welding rate of 2 mm/sec, for example.

In the case of using a welding condition other than the aforementioned, for example, an oxidative gas other than oxygen and carbon dioxide, it is preferable that the operation condition be set such that the oxygen concentration in the welded metal portion (5a) is within the aforementioned range (70 to 220 wt. ppm).

What is claimed is:

1. A TIG welding method, comprising generating an electric arc between an electrode and an object to weld the object, wherein
    a first shielding gas comprising an inert gas flows toward the welded object surrounding the electrode,
    a second shielding gas containing an oxidative gas flows toward the welded object along a periphery of the first shielding gas, and
    the concentration of the oxidative gas in the second shielding gas is set such that a surface tension in a periphery of a molten pool that solidifies into the welded metal portion is lower than a surface tension in a center of the molten pool, and wherein an oxygen concentration in the welded metal portion of the welded object is within a range of 70 to 220 wt. ppm.

2. The TIG welding method according to claim 1, wherein an oxide film formed on a surface of the welded metal portion has a thickness of 20 μm or less.

3. A TIG welding method, comprising generating an electric arc between an electrode and an object to weld the object, wherein
    a first shielding gas comprising an inert gas flows toward the welded object surrounding the electrode,
    a second shielding gas containing an oxidative gas flows toward the welded object from at least two sides of the electrodes as viewed in a welding direction, and
    the concentration of the oxidative gas in the second shielding gas is set such that a surface tension in a periphery of a molten pool that solidifies into the welded metal portion is lower than a surface tension in a center of the molten pool, and wherein an oxygen concentration in the welded metal portion of the welded object is within a range of 70 to 220 wt. ppm.

4. The TIG welding method according to claim 3, wherein an oxide film formed on a surface of the welded metal portion has a thickness of 20 μm or less.

* * * * *

UNITED STATES PATENT AND TRADEMARK OFFICE
CERTIFICATE OF CORRECTION

| | |
|---|---|
| PATENT NO. | : 7,915,560 B2 |
| APPLICATION NO. | : 11/673983 |
| DATED | : March 29, 2011 |
| INVENTOR(S) | : Toyoyuki Sato |

It is certified that error appears in the above-identified patent and that said Letters Patent is hereby corrected as shown below:

On the title page item (12), please delete "Satou" and insert --Sato--.

On the title page item (75), Inventors, line 1, please delete "Satou" and insert --Sato--.

Signed and Sealed this
Twenty-eighth Day of June, 2011

David J. Kappos
*Director of the United States Patent and Trademark Office*